US 8,352,161 B2

(12) United States Patent
Ishii et al.

(10) Patent No.: US 8,352,161 B2
(45) Date of Patent: Jan. 8, 2013

(54) CONTROL DEVICE FOR INTERNAL COMBUSTION ENGINE

(75) Inventors: Daisuke Ishii, Susono (JP); Mamoru Yoshioka, Susono (JP); Makoto Tomimatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 455 days.

(21) Appl. No.: 12/669,932

(22) PCT Filed: Nov. 12, 2008

(86) PCT No.: PCT/IB2008/003040
§ 371 (c)(1),
(2), (4) Date: Jan. 20, 2010

(87) PCT Pub. No.: WO2009/063289
PCT Pub. Date: May 22, 2009

(65) Prior Publication Data
US 2010/0222986 A1 Sep. 2, 2010

(30) Foreign Application Priority Data

Nov. 13, 2007 (JP) .................. 2007-294134
Nov. 20, 2007 (JP) .................. 2007-300031
Mar. 12, 2008 (JP) .................. 2008-062546
Mar. 12, 2008 (JP) .................. 2008-062547

(51) Int. Cl.
*G06F 19/00* (2011.01)
*F02M 25/07* (2006.01)
*F02B 47/08* (2006.01)
*F02D 41/06* (2006.01)
*F02D 21/08* (2006.01)
*B60W 10/06* (2006.01)

(52) U.S. Cl. ............. 701/108; 123/90.15; 123/478; 123/568.14; 123/179.18; 701/104; 477/111

(58) Field of Classification Search ............... 123/90.11, 123/90.15–90.18, 179.16, 179.18, 316, 568.11, 123/568.14, 478, 480, 491–493; 701/101–105, 701/108, 110, 115; 60/605.2; 477/111
See application file for complete search history.

(56) References Cited

U.S. PATENT DOCUMENTS
6,305,364 B1 * 10/2001 Ma ......................... 123/568.14
(Continued)

FOREIGN PATENT DOCUMENTS
JP    U-05-066237    9/1993
(Continued)

OTHER PUBLICATIONS

Japanese Office Action issued in Application No. 2008-062546; Drafted Dec. 18, 2009 (With Partial Translation).
(Continued)

*Primary Examiner* — Willis R Wolfe, Jr.
(74) *Attorney, Agent, or Firm* — Oliff & Berridge, PLC

(57) ABSTRACT

An exhaust valve early-closure control brings about blowback of exhaust gas into an intake system. However, if the exhaust valve early-closure control is executed, for example, during a first idle operation immediately following the startup of the engine, or the like, the amount of blowback exhaust gas becomes excessively large. Therefore, when the post-startup increase amount has decreased to or below a lower-limit criterion value, the ECU prohibits the exhaust valve early-closure control, and changes the control to a usual valve timing control. As a result, during a period during which the combustion state has a stability margin and the amount of emission of HCs and the like is large, the exhaust emission quality can be bettered by the exhaust valve early-closure control. Besides, when the post-startup increase amount has decreased, the combustion state can be stabilized by prohibiting the exhaust valve early-closure control.

26 Claims, 17 Drawing Sheets

U.S. PATENT DOCUMENTS

| | | | |
|---|---|---|---|
| 6,840,235 B2 * | 1/2005 | Koseki et al. | 123/568.14 |
| 7,222,602 B2 * | 5/2007 | Fukasawa | 123/299 |
| 7,461,622 B2 * | 12/2008 | Maemura et al. | 123/305 |
| 7,533,657 B2 * | 5/2009 | Onodera | 123/568.11 |
| 2001/0050067 A1 | 12/2001 | Sato | |
| 2003/0070637 A1 | 4/2003 | Majima | |
| 2006/0207557 A1 | 9/2006 | Ito et al. | |

FOREIGN PATENT DOCUMENTS

| | | |
|---|---|---|
| JP | A-06-294372 | 10/1994 |
| JP | A-06-346764 | 12/1994 |
| JP | A-08-004579 | 1/1996 |
| JP | A-08-200107 | 8/1996 |
| JP | A-10-176557 | 6/1998 |
| JP | A-11-270371 | 5/1999 |
| JP | A-2000-073803 | 3/2000 |
| JP | A-2001-241340 | 9/2001 |
| JP | A-2001-355462 | 12/2001 |
| JP | A-2002-242709 | 8/2002 |
| JP | A-2002-242714 | 8/2002 |
| JP | A-2003-003873 | 1/2003 |
| JP | A-2003-129848 | 5/2003 |
| JP | A-2003-293711 | 10/2003 |
| JP | A-2004-251157 | 9/2004 |
| JP | A-2004-293458 | 10/2004 |
| JP | A-2005-098186 | 4/2005 |
| JP | A-2005-163725 | 6/2005 |
| JP | A-2007-009705 | 1/2007 |
| JP | A-2007-032415 | 2/2007 |
| JP | A-2007-154814 | 6/2007 |
| JP | A-2007-177707 | 7/2007 |
| WO | WO0290746 A1 * 11/2002 | 123/568.14 |
| WO | WO 2007/015150 A1 | 2/2007 |

OTHER PUBLICATIONS

International Search Report issued in International Application No. PCT/IB2008/003040; Mailed on Apr. 20, 2009.

Written Opinion of the International Searching Authority issued in International Application No. PCT/IB2008/003040; Mailed on Apr. 20, 2009.

* cited by examiner

USUAL VALVE TIMING CONTROL

INITIAL TIMING

EXHAUST VALVE EARLY-CLOSURE CONTROL

BLOWBACK AMOUNT-REDUCING CONTROL

BLOWBACK AMOUNT-REDUCING CONTROL

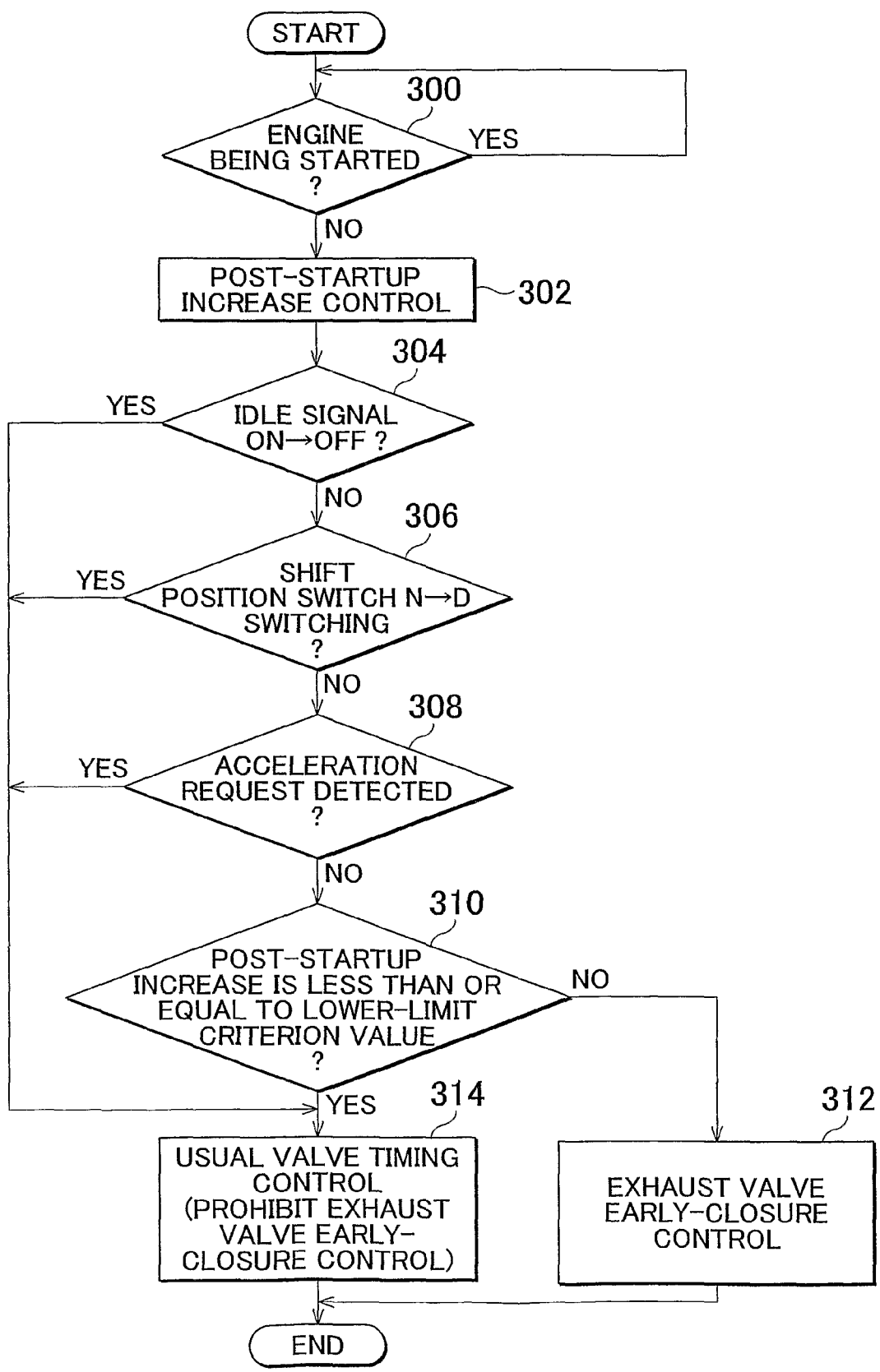

| Ne[rpm] | 1500 | ← | ← | ← | 650 |
|---|---|---|---|---|---|
| TORQUE[Nm] | 17 | ← | ← | 14.5 | ← |
| SA[° CA] | A10 | ← | B10 | ← | ← |
| A/F[-] | 15.5 | 14.5 | ← | ← | ← |

| COLD F/I | HOT IDLING |
|---|---|
| HIGH LOAD | LOW LOAD |
| STABLE COMBUSTION | UNSTABLE COMBUSTION |

CONTROL DEVICE FOR INTERNAL COMBUSTION ENGINE

INCORPORATION BY REFERENCE

The disclosures of Japanese Patent Applications Nos. 2007-294134 filed on Nov. 13, 2007, No. 2007-300031 filed Nov. 20, 2007, No. 2008-062546 filed on Mar. 12, 2008 and No. 2008-062547 filed on Mar. 12, 2008, including the specifications, drawings and abstract are incorporated herein by references in the entireties.

BACKGROUND OF THE INVENTION

1. Field of the Invention

The invention relates to a control device for an internal combustion engine and, more particularly, to a control device for an internal combustion engine equipped with a variable valve mechanism that variably sets the valve timing.

2. Description of the Related Art

A control device for an internal combustion engine equipped with a variable valve mechanism is known, as disclosed in, for example, Japanese Patent Application Publication No. 2001-355462 (JP-A-2001-355462). This kind of control device for internal combustion engines according to the related art has a construction in which an exhaust valve early-closure control is executed when an internal combustion engine is undergoing a low-speed and low-load operation.

In the exhaust valve early-closure control, the exhaust valve closure timing is advanced by operating a variable valve mechanism. As a result, in the vicinity of the intake top dead center, a period during which the intake and exhaust valves are both in a closed valve state (so-called minus overlap period) occurs, or an existing minus overlap period is elongated.

During the minus overlap period, the exhaust gas remaining in each cylinder is compressed to have high temperature by an ascending motion of the piston. Therefore, in the related art, the combustion characteristic is bettered by producing a high-temperature remaining exhaust gas through the exhaust valve early-closure control, and by utilizing the remaining exhaust gas as an internal EGR gas.

Besides, in the related art, when the idle operation is performed, the exhaust valve early-closure control is not executed, but the exhaust valve is closed substantially at the intake top dead center. As a result, the combustion characteristic becomes stabilized by an amount that corresponds to the reduction (or elimination) of the blowback of exhaust gas. In the related art, therefore, the idle stability is improved.

By the way, in the related art, the remaining exhaust gas in each cylinder is compressed during the minus overlap period by the exhaust valve early-closure control. In the exhaust valve early-closure control, if the intake valve opens after the minus overlap period ends, there occurs a blowback of the remaining exhaust gas from the cylinder to the intake system.

Hence, if the exhaust valve early-closure control is implemented during a period from the starting of the internal combustion engine until after the engine has been started up, the state of combustion can be bettered by the blowback of exhaust gas. That is, when the intake negative pressure is small at the time of and after the starting of the engine, the blowback of exhaust gas is caused to adequately occur, and is caused to collide with injected fuel so that the fuel is atomized into fine particles.

However, for example, at the time of the first idle operation immediately following the startup of the engine, the intake negative pressure increases with rises in the engine rotation speed. If the exhaust valve early-closure control is implemented in a state in which the intake negative pressure has increased in the foregoing manner, the amount of blowback of exhaust gas is likely to become excessively large and the combustion state is likely to deteriorate since the pressure difference between the inside of the cylinder and the intake side is great. Therefore, the related art has a problem of it being difficult to favorably carry out both the early-closure control and the idle stabilization even if the exhaust valve early-closure control can be implemented at the time of idle operation.

SUMMARY OF THE INVENTION

The invention has been accomplished in view of the foregoing problems, and provides a control device for an internal combustion engine that is able to stabilize the state of combustion while bettering the exhaust emission quality through an exhaust valve early-closure control.

According one aspect of the invention, there is provided an internal combustion engine control device comprising: a variable valve mechanism that variably sets valve timing of at least one of an intake valve and an exhaust valve of an internal combustion engine; a blowback generation device that causes blowback of exhaust gas from a cylinder toward an intake system through control of the valve timing by the variable valve mechanism; a usual valve timing control device that, when the blowback generation device is not in operation, controls the valve timing while having a less amount of blowback exhaust gas than the blowback generation device by operating the variable valve mechanism according to an operation state of the internal combustion engine; an injection amount increase device that calculates an increase in injection amount for keeping fuel injection amount of the internal combustion engine in an increased state, and decreases the increase in injection amount as time elapses; and a blowback prohibition device that prohibits operation of the blowback generation device when the increase in injection amount decreases to or below a lower-limit criterion value.

In the internal combustion engine control device, it is preferable that the blowback generation device causes blowback of exhaust gas from the cylinder toward the intake system by controlling an exhaust valve closure timing of the exhaust valve in crank angle to an advanced side from the timing that corresponds to an intake top dead center.

According to the foregoing control device for an internal combustion engine, if the blowback generation device is operating when the increase in injection amount has decreased to or below the lower-limit criterion value, the amount of blowback exhaust gas becomes excessively large. Therefore, according to the increase-in-injection-amount decrease-time blowback prohibition device, if the increase in injection amount decreases to or below the lower-limit criterion value and the state of combustion is adversely affected by blowback exhaust gas, the operation of the blowback generation device can be certainly prohibited.

That is, it is possible to operate the blowback generation device only during such a suitable period that the effect of blowback is fully achieved (a period during which the state of combustion has a stability margin and the amount of emission of HCs and the like is large), and to stabilize the state of combustion through the usual valve timing control during the other periods. Therefore, even in the case where the first idle operation or the like is performed immediately after the engine is started up, it is possible to improve the driveability while bettering the exhaust emission quality.

In the internal combustion engine control device, it is also preferable that the blowback prohibition device prohibit operation of the blowback generation device when an acceleration request for the internal combustion engine is detected.

According to this internal combustion engine control device, during operation of the blowback generation device, pumping loss or the like occurs, and therefore it is difficult to raise the output of the internal combustion engine corresponding to the acceleration request. Therefore, according to the acceleration request-time blowback prohibition device, when an acceleration operation is performed, the operation can be detected and the operation of the blowback generation device can be quickly prohibited. As a result, the control smoothly changes to the usual valve timing control, so that the acceleration request can be favorably coped with. Therefore, at the time of the acceleration request, the output of the internal combustion engine can certainly be increased, so that the driveability can be improved.

Besides, in the internal combustion engine control device, it is also preferable that the blowback prohibition device prohibit operation of the blowback generation device when generation of an acceleration request for the internal combustion engine is expected.

According to the forgoing internal combustion engine control device, under a situation where the blowback generation device operates, such as a situation immediately following the startup of the engine, or the like, the response of the variable valve mechanism becomes lower than during a usual operation state. Therefore, according to the blowback prohibition device, at the time point when generation of the acceleration request is expected, the operation of the blowback generation device can be quickly prohibited, and the switch to the usual valve timing control can be implemented. That is, the switching of control can be started before the acceleration request is actually generated.

As a result, even during operation of the blowback generation device during which the response delay of the variable valve mechanism is great, the usual valve timing control can be started in accordance with the generation timing of the acceleration request. Hence, the occurrence of insufficient output or the like during an early period of acceleration due to response delay of the control can be avoided, so that the driveability can be improved.

It is also preferable that the control device further include an idling detection device that outputs an idle signal when an accelerator operation device that is operated to accelerate or decelerate the internal combustion engine is in a non-operated state, and that the blowback prohibition device expect occurrence of the acceleration request when output of the idling detection device changes from the idle signal to a non-idle signal.

According to the foregoing internal combustion engine control device, the output of the idling detection device can be changed from the idle signal to the non-idle signal before the acceleration request is produced by the accelerator operation device being greatly operated. Therefore, the blowback prohibition device can predict the generation of the acceleration request beforehand in accordance with the output state of the idle signal.

Besides, it is also preferable that the foregoing internal combustion engine control device further include a shift position detection device that detects whether a shift operation device that is operated to perform transmission speed shift operation of the internal combustion engine is present at a neutral position or a drive operation position, and that the blowback prohibition device expect occurrence of the acceleration request when the shift operation device is switched from the neutral position to the drive operation position.

According to this internal combustion engine control device, before the acceleration request is generated, the shift operation device is sometimes switched from the neutral position to the drive operation position. Therefore, the blowback prohibition device can expect generation of the acceleration request when the shift operation device is switched from the neutral position to the drive operation position.

In the foregoing internal combustion engine control device, it is also preferable that the blowback generation device bring about a minus overlap period during which the intake valve and the exhaust valve are in a closed state near an intake top dead center, and that the usual valve timing control device make the minus overlap period shorter than the blowback generation device.

According to the internal combustion engine control device described above, the blowback generation device is able to compress the exhaust gas remaining in the cylinder during the minus overlap period, so that the compressed exhaust gas can generate blowback, into the intake system. On the other hand, the usual valve timing control device is able to make the minus overlap period shorter than the blowback generation device, and is also able to bring about a usual valve overlap by causing the minus overlap period to be zero. Therefore, the blowback of exhaust gas can be decreased or substantially eliminated.

In the foregoing internal combustion engine control device, it is also preferable that the lower-limit criterion value be set according to such a minimum increase in injection amount that a combustion state of the internal combustion engine is able to be stabilized even when blowback of exhaust gas occurs.

According to the internal combustion engine control device described above, if the post-startup increase amount is less than the lower-limit criterion value, the state of combustion becomes unstable when the blowback of exhaust gas occurs. Therefore, the range in which the increase in injection amount is less than or equal to the lower-limit criterion value can be set as a prohibition region of the blowback generation device.

According to a further construction of the invention, it is also preferable that the blowback generation device implement an exhaust valve early-closure control of advancing a closure timing of the exhaust valve by operating the variable valve mechanism so as to bring about blowback of exhaust gas in the intake system, and that the control device further include a rotation-corresponding correction device that corrects the closure timing of the exhaust valve set by the exhaust valve early-closure control according to engine rotation speed during an idle operation of the internal combustion engine.

According to the internal combustion engine control device described above, the exhaust valve early-closure control is able to bring about the blowback of exhaust gas by advancing the closure timing of the exhaust valve during the idle operation. At this time, the rotation-corresponding correction device can correct the closure timing of the exhaust valve set by the exhaust valve early-closure control, according to the engine rotation speed. Therefore, even if the amount of blowback flow of exhaust gas increases or decreases according to changes in the engine rotation speed, the amount of blowback flow can be appropriately controlled by correcting the closure timing.

As a result, during the idle operation, deterioration of the state of combustion due to changes in rotation speed can be avoided, and the effects of the exhaust valve early-closure control can be maximally achieved. Therefore, the fuel economy performance or the exhaust emission equality during the idle operation can be bettered, and along with this, the idling stability can also be secured.

In the foregoing internal combustion engine control device, it is preferable that the rotation-corresponding correction device retard the closure timing of the exhaust valve further if the engine rotation speed during the idle operation is higher.

According to the internal combustion engine control device described above, the rotation-corresponding correction device can correct the closure timing of the exhaust valve further to the retarded side the higher the engine rotation speed during the idle operation is. Therefore, during low rotation speed of the engine, a state in which the closure timing of the exhaust valve has been advanced can be maintained, since the amount of blowback flow is relatively small. As a result, it becomes possible to actively perform the exhaust valve early-closure control while restraining the effect that the blowback has on the state of combustion.

Besides, when the engine rotation speed is high, the closure timing of the exhaust valve can be retarded by a corresponding amount. Therefore, the amount of increase in the amount of blowback flow of exhaust gas due to the effect of a rise of the rotation speed can be cancelled out by retardation of the closure timing, and the amount of blowback flow of exhaust gas can be appropriately controlled according to the stability of combustion.

Besides, it is also preferable that the foregoing internal combustion engine control device further include a temperature detection device that detects a temperature state of the internal combustion engine, and a temperature-corresponding correction device that retards the closure timing of the exhaust valve further if the temperature state of the idle operation is higher.

According to the internal combustion engine control device described above, the temperature-corresponding correction device can correct the closure timing of the exhaust valve further to the retarded side the higher the temperature state during the idle operation is. In this case, when the cooling liquid temperature is low, for example, during the cold first idle operation or the like, the friction of the internal combustion engine is great and high-load operation is performed, so that the state of combustion has a stability margin, and the amount of blowback flow of exhaust gas can be increased.

Hence, at the time of low cooling liquid temperature during which the amount of emission of HCs and the like is large, the closure timing of the exhaust valve can be kept in the advanced state, and the effects of the exhaust valve early-closure control can be fully achieved. Besides, at the time of high cooling liquid temperature, for example, during a hot idle operation or the like, the state of combustion does not have a stability margin, so that the closure timing of the exhaust valve can be retarded. Therefore, the effect of blowback can be restrained, and stabilization of the combustion state can be given higher priority.

Beside, according to a further construction of the invention, it is also preferable that the internal combustion engine control device include an outside air temperature acquisition device that acquires temperature of an outside air, and that the blowback generation device determine, based on at least the outside air temperature, whether or not to execute a minus valve overlap period formation control, and execute the minus valve overlap period formation control if it is determined that the minus valve overlap period formation control is to be executed.

The "outside air temperature" herein means the temperature of air surrounding the internal combustion engine.

According to the internal combustion engine control device described above, in the case where the outside air temperature is low, it is determined that the minus valve overlap period formation control is to be executed. Therefore, even in the case where the outside air temperature is low, the decline in the cooling liquid temperature can be restrained, and the degree of rise of the cooling liquid temperature can be increased.

Therefore, for example, even in the case where the outside air temperature is low, the temperature of the cooling liquid can be changed to a temperature that is higher than or equal to the heater-required temperature when there is a heater request from the driver. Besides, the cooling liquid temperature can be quickly caused to reach the heater-required temperature.

Besides, in the case where decline in the cooling liquid temperature is restrained or the degree of rise of the cooling liquid temperature is enlarged by executing the minus valve overlap period formation control, the fluctuation of the output of the internal combustion engine is smaller than in the case where decline in the cooling liquid temperature is restrained or the degree of rise of the cooling liquid temperature is enlarged by rise in the combustion temperature (i.e., increase of the load, adjustment of the ignition timing, etc.). Therefore, according to this construction, it is possible to restrain the decline in the cooling liquid temperature and enlarge the degree of rise of the cooling liquid temperature while restraining the deterioration of driveability.

Besides, in the foregoing internal combustion engine control device, it is also preferable that the blowback generation device execute as the minus valve overlap period formation control a first control of determining the minus valve overlap period in accordance with a first pattern if a predetermined condition that does not include a condition that concerns the outside air temperature is satisfied, and that the blowback generation device execute as the minus valve overlap period formation control a second control of determining the minus valve overlap period in accordance with a second pattern if the predetermined condition is not satisfied and the outside air temperature is lower than a first threshold value.

According to the internal combustion engine control device described above, even in the case where the predetermined condition is not satisfied, the second control can be executed to form the minus valve overlap period if the outside air temperature is low. Therefore, the foregoing construction, too, can restrain the decline in the cooling liquid temperature or enlarge the degree of rise of the cooling liquid temperature even in the case where the outside air temperature is low.

In this case, the second pattern of the second control may be the same as the first pattern of the first control, or may also be different therefrom. Besides, the heater request from the driver being present, and the accelerator operation amount being less than a predetermined amount of operation may also be included in the condition for executing the second control. This is based on the fact that the need to execute the minus valve overlap period formation control is small in the case where the heater request is not present, or the case where the accelerator operation amount is large.

Besides, it is also preferable that the internal combustion engine control device further include a temperature detection device that acquires temperature of a cooling liquid of the internal combustion engine, and that the blowback generation device execute the second control in a case where the predetermined condition is not satisfied, and where the outside air temperature is lower than the first threshold value, and where the cooling liquid temperature is lower than a second threshold value.

According to the internal combustion engine control device described above, even in the case where the outside air temperature is low, the cooling liquid temperature that is lower than the second threshold value can be quickly caused to reach the second threshold value. Besides, in the case where the cooling liquid temperature is higher than or equal to the second threshold value, and the execution of the second control can be prohibited. Therefore, the incidence of unnecessary execution of the second control can be lessened. As a result, the decline of the fuel economy due to the formation of the minus valve overlap period, or the like can be restrained.

In this case, too, the heater request from the driver being present, and the accelerator operation amount being less than a predetermined amount of operation may also be included in the condition for executing the second control.

Besides, in the internal combustion engine control device, it is also preferable that the blowback generation device execute the second control also in a case where the predetermined condition is not satisfied, and where the outside air temperature is lower than the first threshold value, and where the cooling liquid temperature is higher than or equal to the second threshold value, and where the cooling liquid temperature has a falling tendency.

According to the internal combustion engine control device described above, the second control can be executed before the cooling liquid temperature having been higher than or equal to the second threshold value and having a falling tendency becomes lower than the second threshold value. Therefore, the cooling liquid temperature having a falling tendency can be restrained from declining, and therefore can be restrained from becoming lower than the second threshold value. In this case, too, the heater request from the driver being present, and the accelerator operation amount being less than a predetermined amount of operation may also be included in the condition for executing the second control.

Besides, in the internal combustion engine control device, for example, it is also preferable that the blowback generation device determine a range of value of a parameter representing the operation state of the internal, combustion engine so that the range is larger in a case where the outside air temperature is a second temperature than in a case where the outside air temperature is a first temperature that is higher than the second temperature, and execute the minus valve overlap period formation control if the value of the parameter is within the range.

More concretely, the blowback generation device may determine the range to be a first range in the case where the outside air temperature is greater than or equal to a first threshold value, and may determine the range to be a second range that is larger than the first range in the case where the outside air temperature is lower than the first threshold value.

According to the internal combustion engine control device, described above, in the case where the outside air temperature is low, the range of the value of the parameter representing the operation state of the internal combustion engine (for executing the minus valve overlap period formation control) can be determined to be the second range. Therefore, the incidence of the value of the parameter being within the range can enlarge. As a result, even in the case where the outside air temperature is low, the minus valve overlap period formation control can be executed, so that decline of the cooling liquid temperature can be restrained and the degree of rise of the cooling liquid temperature can be enlarged.

In this case, the heater request from the driver being present, and the accelerator operation amount being less than a predetermined amount of operation may also be included in the condition for determining the foregoing range to be the second range.

Besides, it is also preferable that the internal combustion engine control device further include a temperature detection device that acquires temperature of the cooling liquid of the internal combustion engine, and that the blowback generation device determine the range to be the second range in a case where the outside air temperature is lower than the first threshold value, and where the cooling liquid temperature is lower than a second threshold value.

According to the internal combustion engine control device, even in the case where the outside air temperature is low, the cooling liquid temperature lower than the second threshold value can be quickly brought to the second threshold value. Besides, in the case where the cooling liquid temperature is higher than or equal to the second threshold value, it is possible to prohibit the range from being determined to be the second range. Therefore, this construction, too, can lessen the incidence of the minus valve overlap period being unnecessarily formed, and can restrain decline of the fuel economy or the like.

In this case, too, the heater request from the driver being present, and the accelerator operation amount being less than a predetermined amount of operation may also be included in the condition for determining the foregoing range to be the second range.

Furthermore, in the internal combustion engine control device, it is also preferable that the blowback generation device determines the range to be the second range also in a case where the outside air temperature is lower than the first threshold value, and where the cooling liquid temperature is higher than or equal to the second threshold value, and where the cooling liquid temperature has a falling tendency.

According to the internal combustion engine control device described above; the range can be determined to be the second range before the cooling liquid temperature having been higher than or equal to the second threshold value and having a falling tendency becomes lower than the second threshold value. Therefore, this also can restrain the cooling liquid temperature from becoming lower than the second threshold value. In this case, too, the heater request from the driver being present, and the accelerator operation amount being less than a predetermined amount of operation may also be included in the condition for determining the foregoing range to be the second range.

According to a further construction of the invention, it is also preferable that the internal combustion engine control device include: a negative pressure acquisition device that acquires intake negative pressure of the internal combustion engine; a negative pressure determination device that determines whether or not there is a sufficient intake negative pressure for a brake device when the internal combustion engine enters a decelerating state; and a standard timing setting device that sets the valve timing to a standard timing adapted for a time of deceleration via the variable valve mechanism when it is determined by the negative pressure determination device that the intake negative pressure is sufficient, and that when it is determined by the negative pressure determination device that the intake negative pressure is insufficient, the blowback generation device makes the amount of blowback exhaust gas to the intake system less than the amount of blowback that is caused by the standard timing, by changing the valve timing via the variable valve mechanism.

According to the internal combustion engine control device described above, when the internal combustion engine enters a decelerating state, the negative pressure determination device is able to determine whether or not a sufficient intake negative pressure is generated by the brake device. Then, when it is determined that the intake negative pressure is sufficient, the control device is able to set the valve timing to the deceleration-time standard timing via the standard timing setting device. Besides, when it is determined that the intake negative pressure is, insufficient, the control device is able to decrease the amount of blowback exhaust gas via a blowback amount reduction device, whereby the intake negative pressure can be heightened.

As a result, at the time of deceleration, when a brake operation is likely to be performed, a sufficient intake negative pressure for the brake device can be stably secured. Therefore, it is possible to avoid increase of the operating force on the brake or deterioration of the operation feel thereof due to insufficient intake negative pressure, and thus favorably operate the brake device.

Besides, in the internal combustion engine control device, it is also preferable that the standard timing be an initial valve timing that is used as an initial setting of the valve timing when the variable valve mechanism starts to operate.

According to the internal combustion engine control device described above, when the internal combustion engine is started, there is a need to keep the valves with a predetermined initial valve timing even at a time point when the variable valve mechanism has not been supplied with oil pressure or electric power. To this end, the variable valve mechanism is equipped with a lock mechanism for mechanically locking the valves to the initial valve timing. The lock mechanism is able to perform the locking operation when the valves are operating with the initial valve timing.

Therefore, the standard timing setting device uses the initial valve timing as the deceleration-time standard timing. Hence, the valves can be operated with the initial valve timing during deceleration of the internal combustion engine, except when the blowback amount reduction device operates. Therefore, when the internal combustion engine comes to a stop from a decelerating state, the valve timing can be returned to the initial valve timing prior to the stop. Therefore, when the internal combustion engine stops, the return of the valve timing to the initial valve timing can be quickly followed by operation of the lock mechanism, whereby preparations for the restarting of the engine can be made.

Besides, in the internal combustion engine control device, it is preferable that the standard timing provide a minus overlap period during which both the intake valve and the exhaust valve are in a closed state, and that the blowback generation device decrease the amount of blowback exhaust gas by shortening the minus overlap period.

According to the internal combustion engine control device described above, the blowback generation device is able to shorten the minus overlap period of the intake valve and the exhaust valve. Therefore, the exhaust gas within the combustion chamber is not extremely compressed during the minus overlap period. As a result, the amount of blowback exhaust gas can be decreased, and the intake negative pressure can be heightened.

In the internal combustion engine control device, it is preferable that the blowback generation device shorten the minus overlap period by retarding the valve timing of the exhaust valve.

According to the internal combustion engine control device described above, the blowback generation device is able to retard the valve timing of the exhaust valve via the variable valve mechanism. Therefore, the minus overlap period can be shortened, so that the amount of blowback exhaust gas can be decreased.

Besides, in the internal combustion engine control device, it is preferable that the blowback generation device shorten the minus overlap period by advancing the valve timing of the intake valve.

According to the internal combustion engine control device described above, the blowback generation device is able to advance the valve timing of the intake valve via the variable valve mechanism. Therefore, the minus overlap period can be shortened, so that the amount of blowback exhaust gas can be decreased.

It is to be noted herein that when the internal combustion engine is stopped, there is a need to keep the valves with the predetermined initial valve timing via the variable valve mechanism so as to prepare for restart of the engine. As for the intake-side variable valve mechanism, the operating direction thereof for returning the advanced timing of the intake valve to the initial valve timing is the same as the rotating direction of the output shaft of the internal combustion engine. Therefore, the intake-side variable valve mechanism has a faster speed of returning the timing of the intake valve to the initial valve timing than the exhaust-side variable valve mechanism.

That is, even in the case where the valve timing is advanced when the engine rotation speed is low, the intake-side variable valve mechanism can return the valve timing to the initial valve timing at high speed during a period before the internal combustion engine stops. Therefore, by advancing the valve timing of the intake valve, it becomes possible to operate the blowback generation device even in a lower engine rotation speed range. As a result, in a wide range from high rotation speed to low rotation speed, an intake negative pressure sufficient for the brake device can be stably secured.

Besides, it is also preferable that the internal combustion engine control device include a memory device in which the valve timing that minimizes the amount of blowback exhaust gas is pre-stored as a target timing, and that the blowback generation device set the valve timing to the target timing when the amount of blowback exhaust gas is to be decreased.

According to the internal combustion engine control device described above, the optimum valve timing that minimizes the amount of blowback exhaust gas can be found beforehand through experiments or the like. This optimum valve timing can be stored as a target timing in the memory device. Then, the blowback generation device can set the valve timing to the target timing. Therefore, the blowback of exhaust gas can be decreased to a minimum amount, so that the intake negative pressure can be maximally heightened.

Besides, it is preferable that the internal combustion engine control device include a return device that returns the valve timing to the standard timing when a sufficient intake negative pressure occurs during operation of the blowback generation device.

According to the internal combustion engine control device described above, if the intake negative pressure is sufficiently raised by operation of the blowback generation device, the blowback generation device can be stopped by the return device. Therefore, the valve timing can be returned to the standard timing, so that an appropriate control can be performed according to situations.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 6 is a flowchart of a routine executed in a third embodiment of the invention;

DETAILED DESCRIPTION OF EMBODIMENTS

Figure 1:
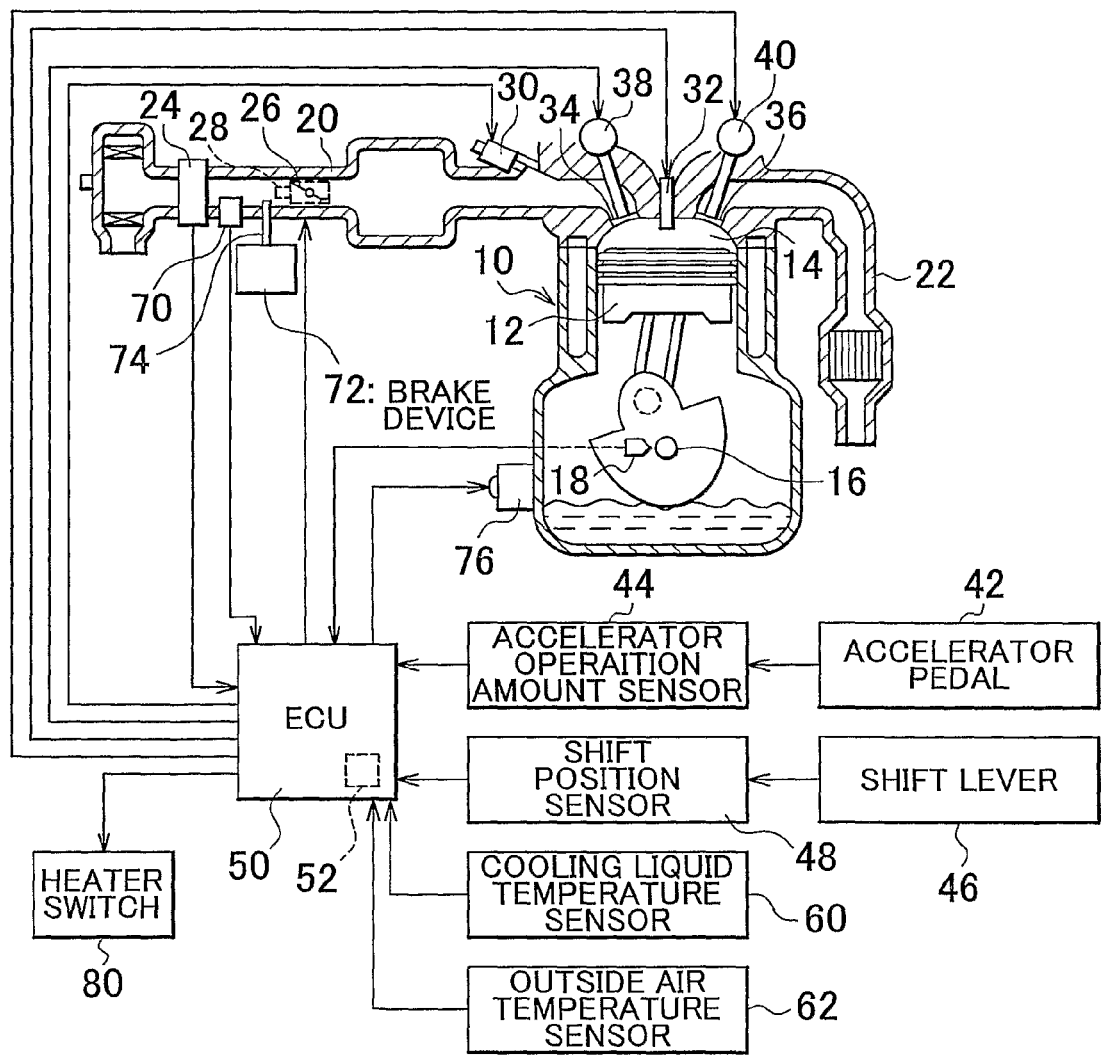
FIG. 1 is an overall diagram for describing a system construction of a first embodiment of the invention.
Figure 2A:
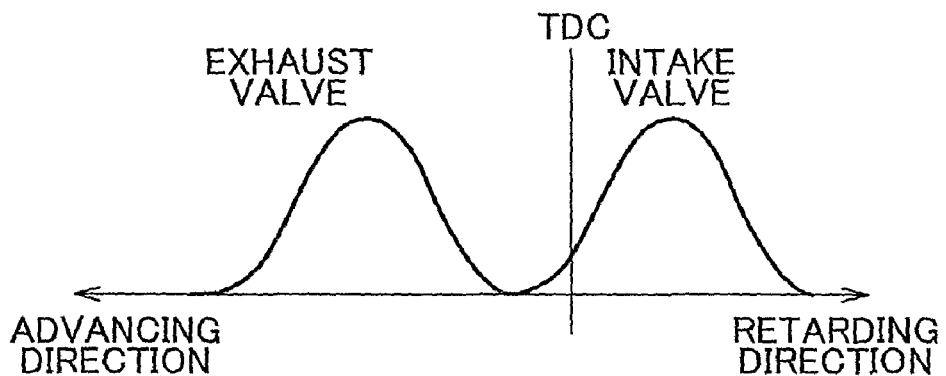
FIG. 2A is an illustrative diagram showing a relation between the valve lift amount and the crank angle in a usual valve timing control.

Example embodiments of the present invention will be described in greater detail below with reference to the accompanying drawings. With reference to FIGS. 1 to 3, a system construction of an internal combustion engine that is applied to embodiments of the invention will be described below. FIG. 1 shows an overall construction diagram for describing the system construction. The system of this embodiment includes, for example, a multicylinder internal combustion engine 10 that is mounted in a vehicle. Each cylinder is provided with a combustion chamber 14 that is defined by the cylinder and a corresponding one of pistons 12. The pistons 12 of the cylinders are linked to a crankshaft 16. Besides, the internal combustion engine 10 is equipped with a crank angle sensor 18 for detecting the rotation angle (crank angle) of the crankshaft 16. The crank angle sensor 18 detects the rotation speed NE of the internal combustion engine 10.

Each cylinder of the internal combustion engine is equipped with an intake passageway 20 through which intake air flows toward the combustion chamber 14, and an exhaust passageway 22 through which exhaust gas flows out from the combustion chamber 14. The intake passageway 20 is provided with an air flow meter 24 that detects the amount of intake air, and an electronically controlled throttle valve 26 that adjusts the intake air amount. The throttle valve 26 is driven by a throttle motor 28 on the basis of the accelerator operation amount or the like.

Besides, each cylinder of the internal combustion engine is equipped with a fuel injection valve 30 that injects fuel into the intake air, an ignition plug 32 that ignites the air-fuel mixture, an intake valve 34 that opens and closes the combustion chamber 14 with respect to the intake passageway 20, and an exhaust valve 36 that opens and closes the combustion chamber 14 with respect to the exhaust passageway 22. The opening/closure timing (valve timing) of the intake valve 34 of each cylinder is variably set by an exhaust VVT 38. The opening/closure timing of the exhaust valve 36 is variably set by an exhaust VVT 40. These VVTs (Variable Valve Timing systems) 38, 40 constitute a variable valve mechanism of this embodiment.

The VVTs 38, 40 are constructed by using a known technology described, for example, in Japanese Patent Application Publication No. 2003-293711 (JP-A-2003-293711), or the like. Then, the exhaust VVT 38 advances or retards the phase (the opening timing and the closure timing) of the intake valve 34 of each cylinder in accordance with a command signal input from an ECU 50. Similarly, the exhaust-side VVT 40 also advances or retards the phase of the exhaust valve 36 of each cylinder in accordance with a command signal from the ECU 50.

Besides, the internal combustion engine 10 is equipped with a cooling liquid temperature sensor 60 and an outside air temperature sensor 62. The cooling liquid temperature sensor 60 is designed so as to detect a cooling liquid temperature THW of the internal combustion engine 10. The outside air temperature sensor 62 is designed so as to detect an outside air temperature THA.

Furthermore, the internal combustion engine 10 is also equipped with an accelerator pedal 42 as an accelerator operation device that a driver of the vehicle operates to accelerate or decelerate the vehicle, and an accelerator operation amount sensor 44 that detects the amount of operation of the accelerator pedal 42. Besides, the internal combustion engine 10 is equipped with a shift lever 46 that the driver operates to shift the speed ratio or step of a transmission device or the like, and a shift position sensor 48 that detects the operation position of the shift lever 46 in order to detect the state of the transmission device, or the like.

The system of this embodiment is provided with a brake device 72 for stopping the vehicle in which the internal combustion engine 10 is mounted. The brake device 72 is equipped with a booster device (not shown) for assisting the driver of the vehicle with the pedal depressing force when the driver depresses the brake pedal. This booster device, utilizing the intake negative pressure of the internal combustion engine 10 that is introduced via the negative-pressure passageway 74, generates an assist force for the driver's brake operation to reduce the depressing force that the driver needs to apply to the brake pedal.

Furthermore, the system of the embodiment includes an ECU (Electronic Control Unit) 50 for controlling the state of operation of the internal combustion engine 10. The ECU 50 is constructed of, for example, a microcomputer that has storage circuits such as a ROM, a RAM, etc.

The input side of the ECU 50 is connected to a sensor system that includes the crank angle sensor 18, the air flow meter 24, the accelerator operation amount sensor 44, the shift position sensor 48, the cooling liquid temperature sensor 60, an intake air pressure, sensor 70, the outside air temperature sensor 62, etc. The output side of the ECU 50 is connected to various actuators that include a throttle motor 28, each fuel injection valve 30, the ignition plug 32, the VVTs 38, 40, a heater switch 80, etc.

The ECU 50 implements operation controls of the internal combustion engine by driving various actuators while detecting the operation state of the internal combustion engine via the sensor system. The operation controls include a usual valve timing control, an exhaust valve early-closure control, and an early-closure prohibition control that are performed by using the VVTs 38, 40. The operation controls also include an idle operation control for keeping the engine rotation speed at an idle target rotation speed when the internal combustion engine is in an idle state. The operation controls further include a rotation-corresponding correction control, a temperature-corresponding correction control, etc. These controls will be described in detail in conjunction with individual embodiments below.

Firstly, a first embodiment of the invention will be described. The usual valve timing control will first be described. The ECU 50 executes the usual valve timing control (hereinafter, referred to as "usual control" when the exhaust valve early-closure control is not executed, for example, when the internal combustion engine is accelerating, or the like. In the usual, control, the ECU 50 controls the opening/closure timing of the valves 34, 36 by operating the VVTs 38, 40 according to the operation state of the internal combustion engine.

FIG. 2 shows a relation between the valve lift amount and the crank angle in the usual control. As shown in this diagram, in the usual control, an overlap period during which the open valve durations of the valves 34, 36 overlap with each other is provided near the intake top dead center. Therefore, during the execution of the usual control, the amount of blowback of exhaust gas becomes less than during the execution of the exhaust valve early-closure control, or a state in which the blowback remains substantially unchanged is maintained.

Incidentally, in conjunction with the embodiment, an example in which the usual control has the valve overlap period is shown. However, the invention is not limited so. That is, the overlap period may be absent in the usual control. Furthermore, in the usual control, a minus overlap period that is shorter than that in the exhaust valve early-closure control may be provided.

Figure 3A:
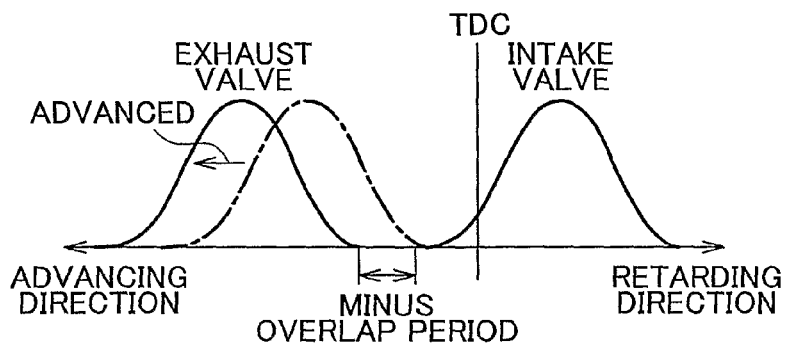
FIG. 3A is an illustrative diagram showing a relation between the valve lift amount and the crank angle in an exhaust valve early-closure control.

Next, the exhaust valve early-closure control will be described. From the time of the starting of the internal combustion engine until after the engine has been started up, the exhaust valve early-closure control is executed according to the operation state or the like. FIG. 3A shows a relation between the valve lift amount and the crank angle in the exhaust valve early-closure control. As shown in this diagram, in the exhaust valve early-closure control, the ECU 50 advances the phase of the exhaust valve 36 of each cylinder, for example, by using the VVT 40. As a result, the exhaust valve 36 closes at earlier timing than in the usual control.

Therefore, in the vicinity of the intake top dead center, a minus overlap period during which both the exhaust valve 36 and the intake valve 34 are in a closed state occurs during a time from after the exhaust valve 36 closes until the intake valve 34 opens. During the minus overlap period, the exhaust gas left in the combustion chamber 14 is compressed by the piston 12 to become a high-temperature and high-pressure state. Then, when the intake valve 34 opens, the residual exhaust gas blows back from the combustion chamber 14 toward the intake passageway 20 (intake port).

Therefore, from the time of the starting of the internal combustion engine until after the engine has been started up, the blowback of exhaust gas raises the temperature of the intake port in an early period, thus accelerating the carburetion of injected fuel. Besides, in the vicinity of the intake port, the exhaust gas blowback collides with the injected fuel. This collision atomizes the injected fuel. Therefore, good air-fuel mixture can be formed at the time of starting of the engine, so that the state of combustion can be bettered In addition, since the exhaust gas blown back into the intake system is sucked into the cylinder again, and burns together with the intake air, a so-called EGR (internal EGR) effect is created. This EGR effect lessens the unburnt component in exhaust gas. Hence, according to the exhaust valve early-closure control, quality betterment of air-fuel mixture and purification of exhaust gas are promoted, so that the quality of exhaust emissions during the time from the starting of the engine until after the engine has been started up can be bettered.

However, for example, during a first idle operation immediately following the startup of the engine, the idle rotation speed is kept at relatively high value in order to accelerate the warmup of the internal combustion engine. Therefore, in the intake system, a relatively large intake negative pressure occurs, so that the pressure difference between the intake system and the inside of the cylinder increases. If during such an operation state of the engine, the exhaust valve early-closure control is implemented, then the amount of the blowback of exhaust gas to the intake system is likely to become excessively large, and the combustion state is likely to deteriorate.

Next, the early-closure prohibition control will be described. Taking the foregoing problems into account, this embodiment is constructed so as to execute the exhaust valve early-closure control at the time of starting the engine and prohibit the exhaust valve early-closure control when the post-startup increase amount of the fuel injection control has decreased to or below a lower-limit criterion value. The post-startup increase amount herein is to keep the amount of fuel injection in an increased state over a certain amount of time after the engine enters the self-sustaining operation subsequently to the completion of startup of the engine, and is a generally known fuel correction amount, for example, as described in Japanese Patent Application Publication No. 8-4579 (JP-A-8-4579) or the like.

Generally, at the time of starting the internal combustion engine, the amount of fuel injection is increased in order to enhance the startability. However, even after the startup is completed, the combustion state is likely to fluctuate until the warmup of the engine ends. Therefore, the post-startup increase amount serves to keep the air-fuel mixture in a rich state for some time after the startup of the engine by increasing the amount of fuel injection from a basic injection amount.

The combustion state of the internal combustion engine becomes more, stable as the engine warms up. Therefore, the post-startup increase amount gradually decreases and reaches zero as time elapses from the startup. In this case, while the post-startup increase amount is larger than a lower-limit criterion value, the amount of fuel injection is such a considerably increased amount that even if exhaust gas blowback occurs, the combustion state remains stable with a margin. Moreover, at this time, since the post-startup increase amount keeps the air-fuel mixture in a rich state, the amount of emission of HCs and the like is particularly large.

Therefore, in the early-closure prohibition control, while the post-startup increase amount is larger than the lower-limit criterion value, the exhaust valve early-closure control is permitted to be executed so as to cause blowback of exhaust gas. By this operation, the quality betterment of air-fuel mixture and the purification of exhaust gas can be accelerated so as to better the exhaust emission quality during the operation state immediately following the startup of the engine during which the exhaust emission quality is likely to deteriorate.

Besides, when the post-startup increase amount has decreased to or below the lower-limit criterion value, the exhaust emission quality is bettered by an amount that corresponds to the approach of the exhaust air-fuel ratio toward the stoichiometric ratio (stoichiometric air-fuel ratio), but the combustion state loses its stability margin by an amount that corresponds to the decrease in the post-startup increase amount. In this state, if the exhaust valve early-closure control is continued, the aforementioned first idle operation or the like, if performed, is liable to cause excessive amounts of exhaust gas blowback and therefore deteriorate the combustion state.

Therefore, the early-closure prohibition control is a control in which when the post-startup increase amount has decreased to or below the lower-limit criterion value, the exhaust valve early-closure control is prohibited and the usual valve timing control is executed. In this case, the lower-limit criterion value is pre-set according to a minimum post-startup increase amount that can stabilize the combustion state, for example, even when the exhaust valve, early-closure control is implemented during the first idle operation.

That is, if the post-startup increase amount is less than the lower-limit criterion value, the combustion state becomes unstable when the blowback of exhaust gas occurs. Therefore, a range in which the post-startup increase amount is less than or equal to the lower-limit criterion value can be set as a prohibition region in which the exhaust valve early-closure control is prohibited.

As described above, according to the early-closure prohibition control, the exhaust valve early-closure control can certainly be prohibited when the combustion state is adversely affected by the blowback of exhaust gas. That is, it is possible to execute the exhaust valve early-closure control only during the period during which the effect of the blowback is well delivered (the period during which the combustion state has a stability margin and the amount of emission of HCs and the like is large), and to perform the usual valve timing control so as to stabilize the combustion state during the other periods. Therefore, for example, even in the case where the first idle operation or the like is performed immediately after the engine is started up, the exhaust emission quality can be bettered, and the driveability can be improved.

Figure 4:
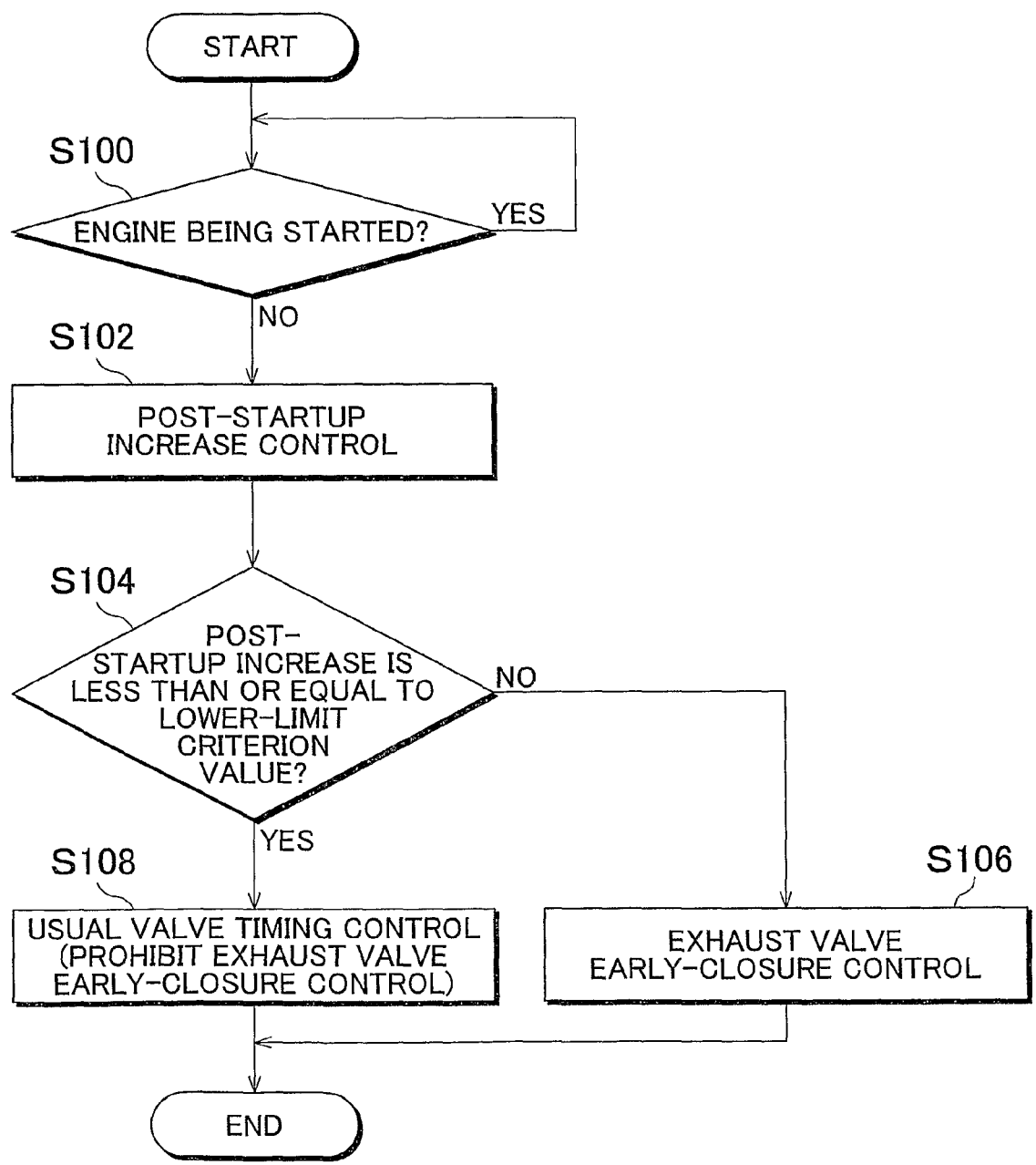
FIG. 4 is a flowchart of a routine executed in the first embodiment of the invention.

Next, a concrete control of the first embodiment will be described. FIG. 4 shows a flowchart of a routine that the ECU 50 executes in order to realize a system operation of this embodiment. Incidentally, the routine shown in FIG. 4 is repeatedly executed over the time from the starting the internal combustion engine until after the startup of the engine.

As shown in FIG. 4, ECU 50 firstly determines whether or not the internal combustion engine is being started (the cranking operation is being performed) (step 100). If the engine is being started, the ECU 50 waits until the starting of the engine ends. Besides, during the starting of the engine, the amount of fuel injection for the startup thereof is computed according to, for example, the temperature of the cooling liquid or the like, and then the amount of fuel commensurate with the result of the computation is injected into the intake port.

Next, after the cranking operation ends and the engine enters the self-sustaining operation that follows the startup of the engine, a basic amount of fuel injection is first computed. In this case, the basic amount of fuel injection is set according to, for example, the intake air amount detected by the air flow meter 24, the engine rotation speed detected by the crank angle sensor 18, etc.

Besides, for a while following the startup of the engine, the post-startup increase control of increasing the fuel injection amount from the basic fuel injection amount is executed (step 102). In the post-startup increase control, the post-startup increase amount is computed according to, for example, the temperature of the cooling liquid, the elapsed time from the time point of the end of the startup of the engine, and the computed post-startup increase amount is reflected on the basic fuel injection amount. In this case, the post-startup increase amount decreases, for example, as the temperature of the cooling liquid rises, or gradually decreases as time elapses following the startup of the engine.

Next in step 104, the ECU 50 determines whether or not the post-startup increase amount has decreased to or below the lower-limit criterion value. If the determination is negative, it means that the post-startup increase amount is still large, and therefore it is determined that stable combustion based on a rich mixture is being performed and the amount of emission of HCs is relatively large. Therefore, in that case, the exhaust valve early-closure control is executed (step 106).

Besides, if the determination is positive, it is determined that the post-startup increase amount has decreased to a level that is not suitable for the exhaust valve early-closure control. Therefore, in that case, the exhaust valve early-closure control is prohibited and the usual valve timing control is implemented (step 108). In this manner, the control can be switched between the exhaust valve early-closure control and the usual valve timing control at appropriate timing.

Next, with reference to FIG. 5, a control according to a second embodiment of the invention will be described. The second embodiment is different from the first embodiment in that a control commensurate with an acceleration request made by a driver of the vehicle is performed.

In the second embodiment, the exhaust valve early-closure control is executed only during the period until the post-startup increase amount becomes less than or equal to a lower-limit criterion value, similarly to the first embodiment. However, immediately following the startup of the engine, it sometimes happens that even during the execution of the exhaust valve early-closure control, the acceleration operation is performed via the accelerator pedal 42, and therefore an acceleration request is generated to the internal combustion engine.

Meanwhile, during the execution of the exhaust valve early-closure control, the compression of exhaust gas results in pumping loss, and the blowback exhaust gas accomplishes the EGR. Therefore, it is difficult to raise the output of the internal combustion engine corresponding to the acceleration request while the exhaust valve early-closure control is under execution.

Therefore, the second embodiment is constructed so that when the generation of the acceleration request is detected, the exhaust valve early-closure control is prohibited and the usual valve timing control is implemented. Concretely, when the accelerator pedal 42 is depressed by the driver, this depressing operation is detected as an acceleration request by the accelerator operation amount sensor 44. Besides, when the acceleration request is generated, the exhaust valve early-closure control is prohibited, and, in addition, the fuel injection amount is increased so as to avoid the air-fuel ratio becoming lean.

According to this construction, for example, in the case where the acceleration operation is performed soon after the startup of the engine, or the like, the operation can be promptly detected and the exhaust valve early-closure control can be prohibited. Thus, the control smoothly changes from the exhaust valve early-closure control to the usual valve timing control, thus favorably coping with the acceleration request. Therefore, at the time of the acceleration request, the output of the internal combustion engine can certainly be increased, and therefore the driveability can be improved.

Figure 5:
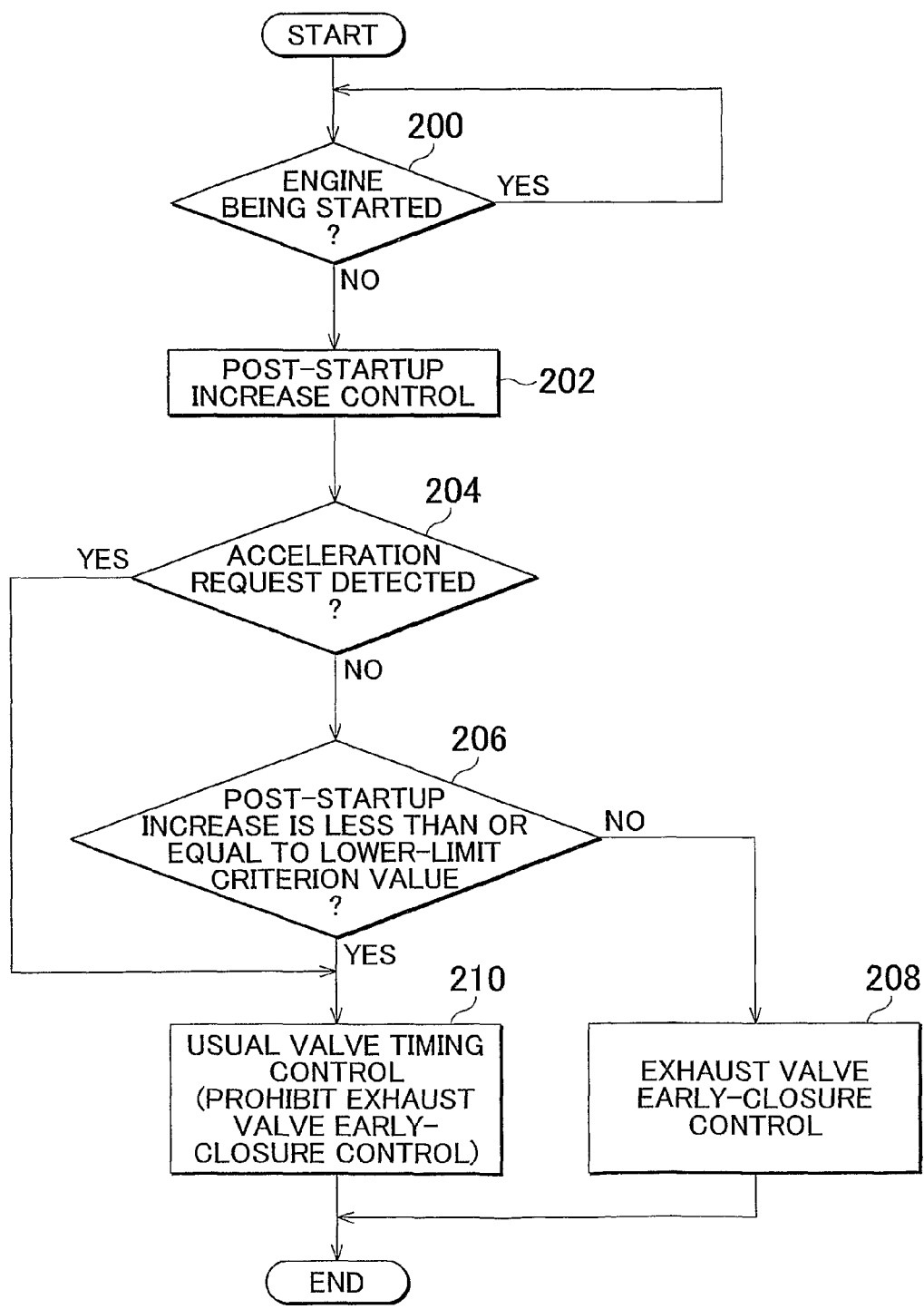
FIG. 5 is a flowchart of a routine executed in a second embodiment of the invention.

FIG. 5 shows a flowchart of a routine that the ECU 50 executes in order to realize a system operation of this embodiment. Incidentally, the routine shown in FIG. 5 is repeatedly executed from the time of the starting of the internal combustion engine until after the engine is started up.

Firstly, as in the first embodiment, the ECU 50 performs the post-startup increase control following the end of the starting of the engine (steps 200, 202). Besides, in step 204, the ECU 50 determines whether or not the acceleration request has been generated, by checking for the depressing operation of the accelerator pedal 42 through the use of a detection signal of the accelerator operation amount sensor 44. If the acceleration request is detected, the ECU 50 prohibits the exhaust valve early-closure control regardless of the magnitude of the post-startup increase amount, and implements the usual valve timing control (step 210).

On the other hand, when the acceleration request is not detected, the ECU 50 determines whether or not the post-startup increase amount has decreased to or below the lower-limit criterion value (step 206), as in the first embodiment. Then, if the determination is negative, the ECU 50 implements the exhaust valve early-closure control in step 208. On the other hand, if the determination is positive, the ECU 50 implements the usual valve timing control in step 210. Therefore, according to this embodiment, substantially the same operations and effects as those of the first embodiment can be obtained, and the acceleration operation following the startup of the engine can appropriately be coped with.

Next, with reference to FIG. 6, a third embodiment of the invention will be described. The third embodiment employs a system construction (FIG. 1) similar to those of the first and second embodiments (shown in FIG. 1), but is different from these embodiments in that the generation of an acceleration request is predicted beforehand, and is coped with.

In the third embodiment, the exhaust valve early-closure control is executed only during the period until the post-startup increase amount becomes equal to or less than to the lower-limit criterion value, similarly to the first embodiment. Besides, as in the second embodiment, there is provided a construction in which the exhaust valve early-closure control is prohibited also when the acceleration request is detected.

However, the exhaust valve early-closure control is often performed during a low-temperature low-speed operation state immediately following the startup of the engine. Under this situation, the response of the valve timing control declines, no matter whether a hydraulic type VVT or an electric type VVT is employed. Particularly in the case of the hydraulic type VVT, the response delay becomes larger the lower the temperature of the internal combustion engine is, and the lower the engine rotation speed is.

That is, under the situation where the exhaust valve early-closure control is executed, the time lag from the engagement of the VVT to an actual change in the valve timing is larger than during the intermediate-to-high speed operation of the engine. Therefore, if the valve timing control is switched from the exhaust valve early-closure control to the usual valve timing control after the acceleration request is detected during the execution of the exhaust valve early-closure control, the acceleration is performed temporarily with the valve timing of the exhaust valve early-closure control, and therefore there is a risk of the output becoming insufficient at the time of transition of the switching of the control.

Therefore, this embodiment is constructed so that the generation of the acceleration request is predicted in advance. Then, when it is predicted that the acceleration request will be generated, the exhaust valve early-closure control is prohibited and the valve timing control changes into the usual valve timing control, similarly to the second embodiment. Besides, the fuel injection amount is increased to avoid the air-fuel ratio becoming lean.

In a concrete example of the prediction device, for example, when an idle signal change from the on-state to the off-state, it is predicted that the acceleration request will be generated. In this case, the idle signal is a signal generated, for example, on software by the ECU 50 according to the output of the accelerator operation amount sensor 44, and is generally known to public. The idle signal becomes on when the accelerator pedal 42 is in the non-operated state (idle position), and becomes of when the accelerator pedal moves apart from the idle position.

According to this construction, the idle signal changes from the on-state to the off-state before the accelerator pedal 42 is greatly depressed to perform the acceleration operation. Therefore, by detecting a change in the idle signal, the occurrence of the acceleration operation can be predicted in advance. In addition, in conjunction with this embodiment, the idle signal realized in a software fashion (so-called soft idle switch) is cited as an example. However, the invention is not limited so. For example, a mechanical idle switch that detects the idle position, for example, from the turning on and off of contacts, may be used.

Besides, as for another prediction device, it is also predicted that the acceleration request will be generated, when the shift lever 46 is switched from the neutral position to a drive operation position. The ECU 50, using the detection signal of the shift position sensor 48, is able to detect that the shift lever 46 has been switched from the neutral position (the N range) to a drive operation position (the D range, the L range, etc.).

According to this construction, when the shift lever 46 is at the neutral position, the lever is switched to the drive operation position before the acceleration is performed. Therefore, by detecting a change in the operation position of the shift lever 46, the generation of the acceleration operation can be predicted in advance.

Hence, according to the third embodiment, the switching from the exhaust valve early-closure control to the usual valve timing control can be implemented at the time point when the generation of the acceleration request is predicted. That is, the switching of the control can be started in advance before the acceleration request actually starts. Therefore, even during the execution of the exhaust valve early-closure control in which the response delay of the VVT is great, the usual valve timing control can be started at the timing of generation of the acceleration request. Hence, the occurrence of insufficient output or the like during an early period of the acceleration due to response delay of the control can be avoided, and the driveability can be improved.

FIG. 6 is a flowchart showing a routine that the ECU 50 executes in order to realize a system operation of the third embodiment. Incidentally, the routine shown in FIG. 6 is repeatedly executed from the time of the starting of the internal combustion engine until after the startup of the engine.

Firstly, as in the first embodiment, the ECU 50 performs the post-startup increase control after the ends of the starting of the engine (steps 300, 302). Next, the ECU 50 determines whether or not the idle signal has changed from the on-state to the off-state, by using the output of the accelerator operation amount sensor 44. Besides, the ECU 50 also determines whether or not the shift lever 46 has been switched from the N range to the D range, by using the output of the shift position sensor 48 (step 306).

If a positive determination is made in step 304 or 306, the ECU 50 predicts that the acceleration request will be generated, and changes the valve timing control from the exhaust valve early-closure control to the usual valve timing control (step 314). On the other hand, if a negative determination is made in each of steps 304, 306, the ECU 50 determines whether or not the acceleration request has been generated (step 308), as in the second embodiment. If this determination is positive, the ECU 50 switches the valve timing control in step 314.

If a negative determination is made in each of the steps 304, 306, 308, the ECU 50 determines that the post-startup increase amount is equal to or less than the lower-limit criterion value in step 310, as in the first embodiment. Then, according to the result of the determination, the ECU 50 implements one of steps 312, 314. Thus, according to the third embodiment, the exhaust valve early-closure control can be implemented only in the case where the generation of the acceleration request is not predicted nor detected, and where the post-startup increase amount is greater than the lower-limit criterion value.

Incidentally, in the first to third embodiments, steps 106, 208, 312 in FIGS. 4 to 6 represent concrete examples of the occurrence of blowback. Besides, steps 108, 210, 314 represent concrete examples of the usual valve timing control, and steps 102, 202, 302 represent concrete examples of the post-startup increase amount. Furthermore, steps 104, 206, 310 represent concrete examples of the prohibition of the blowback at the time of decrease of the increase amount, and steps 204, 308 represent concrete examples of the prohibition of the blowback at the time of the acceleration request. Besides, step 304 represents a concrete example of the prediction of acceleration during idle operation, and step 306 represents a concrete example of the prediction of acceleration during a shift operation of the transmission. These two steps represent a concrete example of the prohibition of the blowback at the time of prediction of acceleration.

Besides, in conjunction with each of the foregoing embodiments, the exhaust valve early-closure control of advancing the closure timing of the exhaust valve 36 is described as a blowback generation device. However, the invention is not limited so. For example, by the intake valve control of retarding the opening timing of the intake valve 34, the minus overlap period may be realized so as to generate the blowback of the exhaust gas. Besides, the intake valve control and the exhaust valve early-closure control may also be combined. Therefore, in the invention, the two VVTs 38, 40 are not altogether necessary. It suffices that at least one of the VVTs 38, 40 that is needed for the startup-time valve control device be provided.

Besides, in each embodiment, the blowback generation device is constructed so as to generate the blowback of exhaust gas by bringing about the minus overlap period. However, the blowback generation device of this invention does not need to bring about the minus overlap period, as long as the blowback of exhaust gas occurs.

Next, a fourth embodiment of the invention will be described. The fourth embodiment concerns a control of the idle state of the internal combustion engine 10. The ECU 50 includes an idle operation control for keeping the engine rotation speed at the idle target rotation speed when the internal combustion engine 10 is in the idle state.

In this case, the idle target rotation speed is variably set according to, for example, the temperature of the cooling liquid detected by the cooling liquid temperature sensor 60, or the like. That is, for example, during the first idle operation in a cold state (during the cold F/I), the idle target rotation speed is set at a higher rotation speed than usual, as shown in FIG. 5, which is described below. Besides, during the hot idle operation following the warmup of the engine, an idle target rotation speed that is lower than the value used during the cold F/I is used.

Figure 7A:
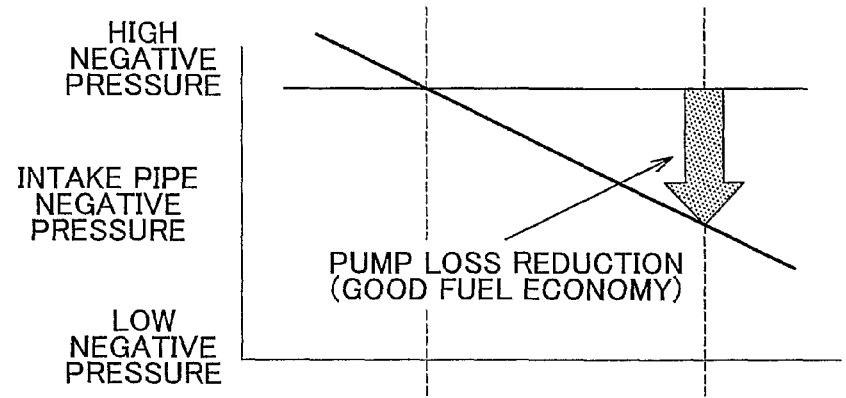
FIGS. 7A, 7B and 7c are illustrative diagrams showing relations of the blowback gas temperature with the intake negative pressure of the internal combustion engine, the atomization of injected fuel, and the temperature of a compression end, respectively.
Figure 7B:
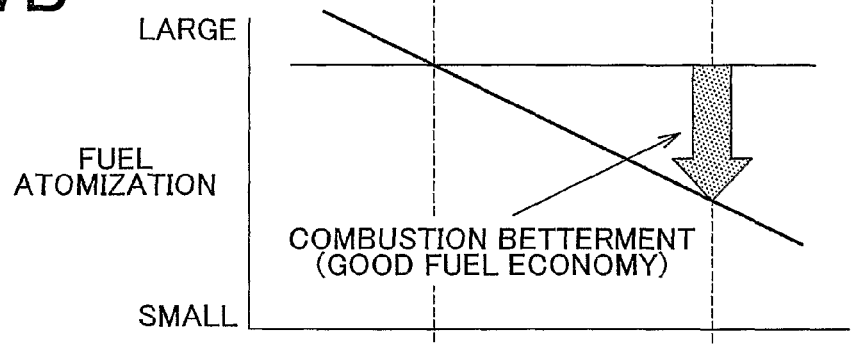
Figure 7C:
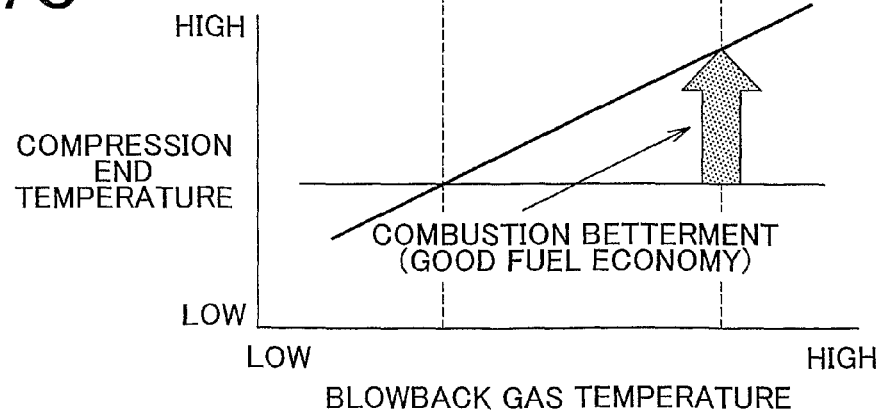

FIGS. 7A to 7C show relations between parameters related to the combustion state of the internal combustion engine and the temperature of the blowback gas. In the diagrams, the usual control shown is an example thereof in which a blowback gas that is equivalent to that caused by the valve overlap in the exhaust valve early-closure control is caused, for comparison with the exhaust valve early-closure control in the same condition.

In the exhaust valve early-closure control, a high-temperature and high-pressure blowback gas is generated, in comparison with the usual control, so that the intake negative pressure is smaller than in the usual control, as shown in FIG. 7A. As a result, the pumping loss decreases, so that the fuel economy performance can be improved. Besides, the blowback gas that flows back into the intake port collides with injected fuel. Therefore, in the exhaust valve early-closure control, the degree of atomization of injected fuel becomes high, so that the combustion state becomes better. As a result, the fuel economy performance and the exhaust emission can be bettered.

Besides, in the exhaust valve early-closure control, since high-temperature blowback gas is re-compressed, the gas temperature at the compression end also becomes higher than in the usual control, and betterment of combustion can be promoted. Besides, since the exhaust gas that is blown back contributes again to the combustion, a so-called EGR (internal EGR) effect is created, so that the exhaust emission can be bettered.

However, the amount of blowback of exhaust gas fluctuates according to the state of operation of the internal combustion engine. Therefore, if the exhaust valve early-closure control is performed during the idle operation, there is risk of the amount of blowback gas becoming excessively large depending on the operation state. Therefore, in this embodiment, during the idle operation, the rotation-corresponding correction control and the temperature-corresponding correction control are implemented so as to correct the closure timing of the exhaust valves according to the state of operation. Therefore, the effect of the foregoing exhaust valve early-closure control and the idle stability are both achieved.

Herein, the rotation-corresponding correction control will be described, This correction control is to correct the closure timing of the exhaust valve set by the exhaust valve early-closure control, according to the engine rotation speed during the idle operation. During the execution of the exhaust valve early-closure control, if the engine rotation speed rises, the compression time during which the blowback of exhaust gas is re-compressed within the combustion chamber shortens. Generally, the amount of the blow-by gas that leaks out of the fitting clearance of the piston ring to the crank chamber side changes according to the compression time. That is, if the compression time shortens, the amount of the blow-by gas decreases.

Besides, if the compression time shortens, the amount of heat that conducts from the gas within the combustion chamber to the cylinder wall surface decreases as well. As a result, during the compression stroke, the exhaust gas, with reduced amount of leak, is compressed in a high-temperature state. Therefore, during the following intake stroke, a relatively large amount of high-temperature blowback gas is produced, and the blowback gas is sucked again into the combustion chamber to serve as an internal EGR gas.

Figures 8, 9:
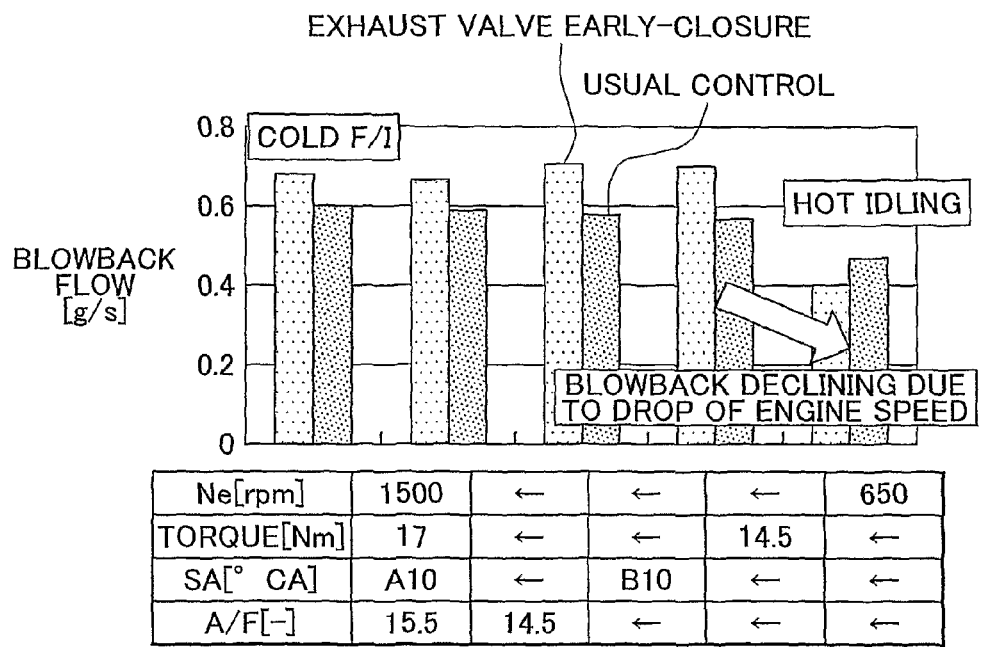
FIG. 8 is an illustrative diagram showing a relation between the amount of blowback flow of exhaust gas and the idle rotation speed.
FIG. 9 is an illustrative diagram showing the state of load and the state of combustion during idle operation with respect to a cold first idle operation and a hot idle operation.

Therefore, in the exhaust valve early-closure control, as the engine rotation speed rises, the amount of blowback of exhaust gas, that is, the amount of the internal EGR gas, increases, so that the state of combustion deteriorates, provided that the amount of timing advancement of the exhaust valve 36 is fixed. FIG. 8 shows a relation between the engine rotation speed Ne and the amount of blowback flow during the idle operation. Incidentally, during the steady state of the idle operation, the engine rotation speed is controlled so as to be substantially equal to the idle target rotation speed.

From this diagram, it can be understood that when the engine rotation speed (idle target rotation speed) is high, the amount of blowback flow becomes large. Therefore, the rotation-corresponding correction control is constructed so that the higher the engine rotation speed during the idle operation is, the further to the timing retarded side the closure timing of the exhaust valve 36 is corrected. According to this construction, during low-speed operation of the engine, the amount of blowback flow is relatively small, so that the closure timing of the exhaust valve can be kept to an advanced timing. Therefore, the exhaust valve early-closure control can be actively performed while the effect that the blowback has on the combustion state is restrained.

Besides, when the engine rotation speed is high, the closure timing of the exhaust valve 36 can be retarded by an amount that corresponds to the high engine speed. Therefore, the amount of increase in the amount of blowback flow of exhaust gas due to the effect of a rise of the rotation speed can be cancelled out by retardation of the closure timing, and the amount of blowback flow of exhaust gas can be appropriately controlled according to the stability of combustion. Therefore, during the idle operation, it is possible to maximally achieve the effect of the exhaust valve early-closure control device while avoiding the deterioration of the combustion state due to change in the engine rotation speed.

Next, the temperature-corresponding correction control will be described. FIG. 9 shows states of load and states of combustion during the idle operation, with regard to the cold F/I operation and the hot idle operation. During the cold F/I operation, since the friction of the internal combustion engine is large, high-load operation is performed. During the high-load operation, the intake air amount (intake negative pressure) is great, and therefore the state of combustion has a stability margin even if the blowback occurs to a certain extent. On the other hand, during the hot idle operation, a relatively low-load state occurs, and therefore the stability of the state of combustion against the blowback of exhaust gas is lower than during the cold F/I operation.

Therefore, in the temperature-corresponding correction control, the higher the cooling liquid temperature is, the more retarded the closure timing of the exhaust valve 36 is. That is, during the low cooling liquid temperature, the amount of blowback flow of exhaust gas can be increased, and therefore the closure timing can be kept at an advanced timing so as to sufficiently achieve the effect of the exhaust valve early-closure control. In particular, during the cold F/I operation, the mixture is in the fuel-rich state, and the amount of emission of HCs and the like is large. Therefore, the exhaust valve early-closure control will better the exhaust emission quality.

Besides, when the cooling liquid temperature is high, the closure timing of the exhaust valve 36 can be retarded. Therefore, for example, during the hot idle operation, the effect of the blowback can be restrained, and therefore the stabilization of the state of combustion can be given priority.

Figure 10:
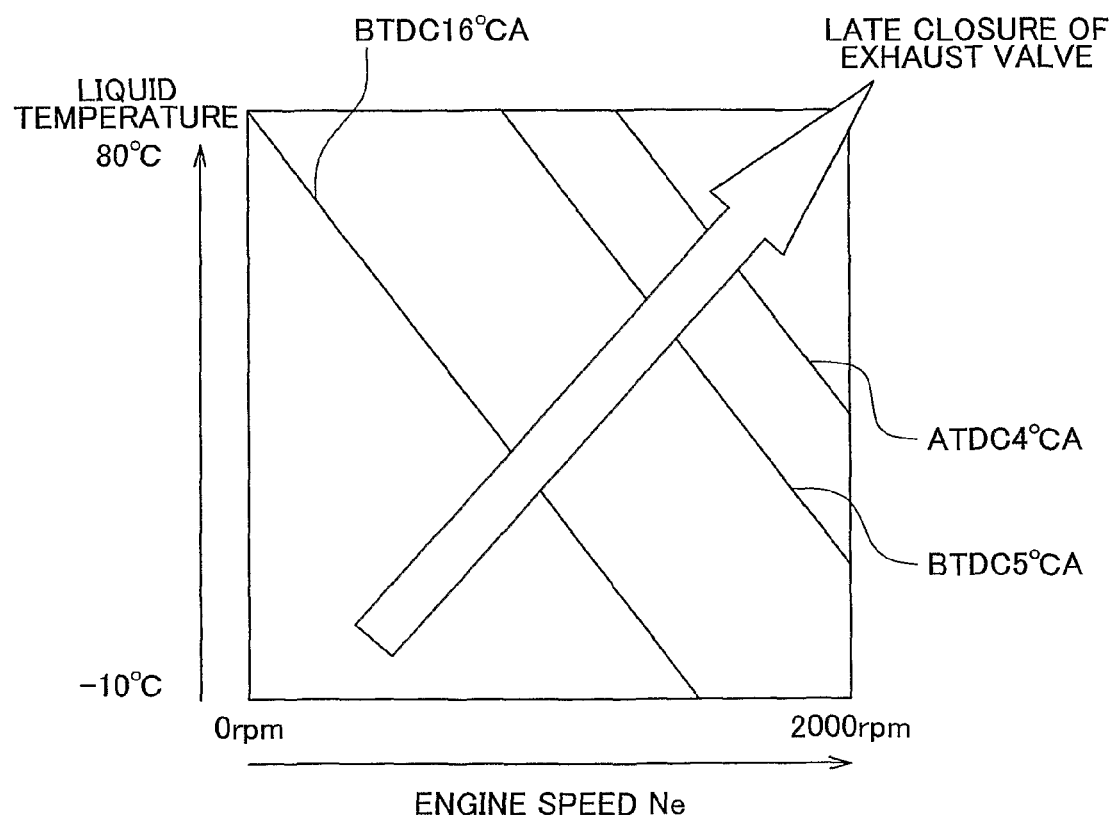
FIG. 10 is a characteristic graph showing relations among the closure timing of the exhaust valve, the idle rotation speed and the cooling liquid temperature.

FIG. 10 is a characteristic graph showing relations among the closure timing of the exhaust valve, the engine rotation speed and the cooling liquid temperature. This characteristic graph is a data-basis representation of the contents of the rotation-corresponding correction control and the temperature-corresponding correction control described above, and is pre-stored in the ECU 50, for example, as two-dimensional map data. As shown in FIG. 10, the closure timing of the exhaust valve 36 is corrected further to the retarded side the higher the engine rotation speed Ne during the idle operation is, and the higher the cooling liquid temperature is.

Figure 11:
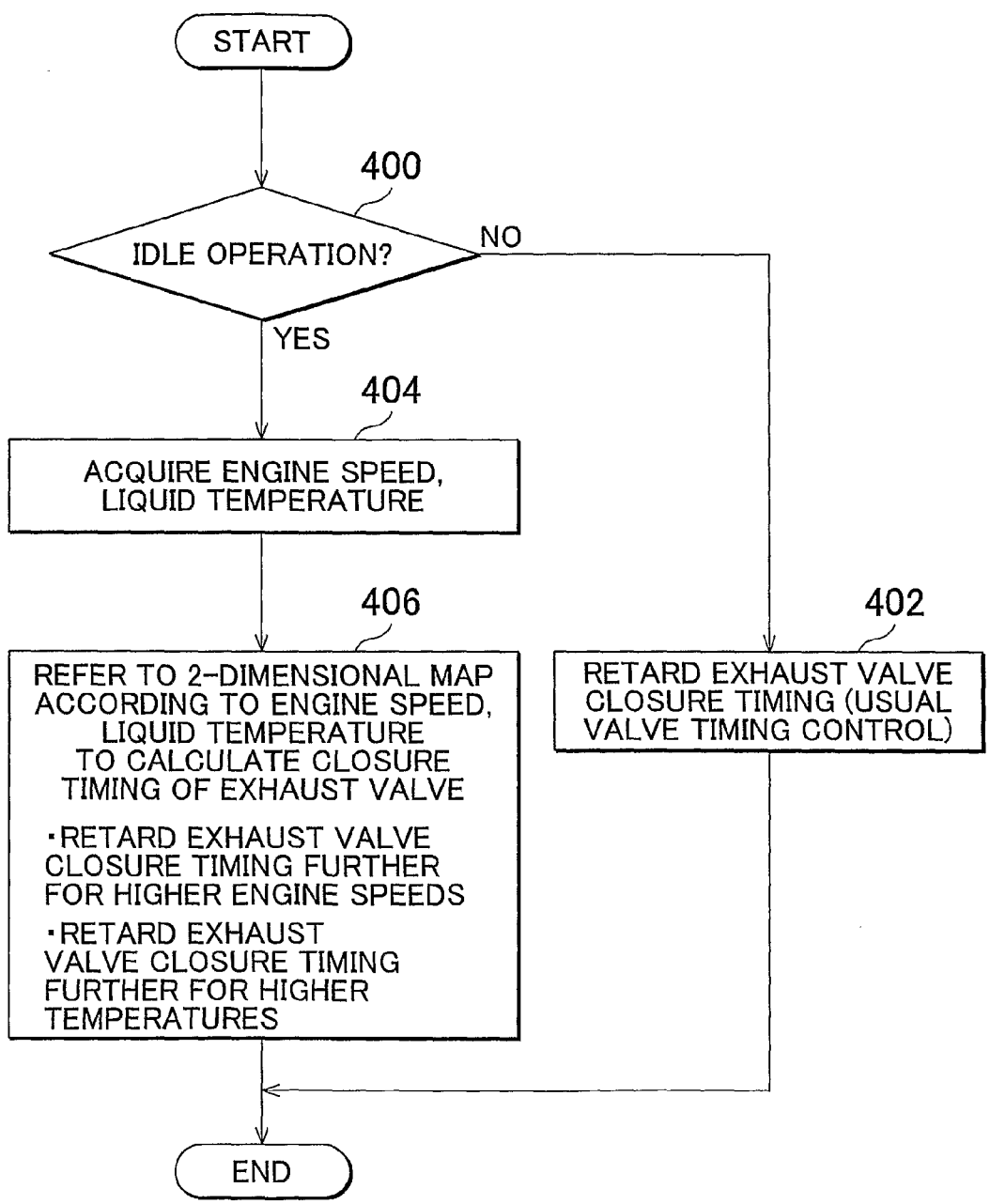
FIG. 11 is a flowchart of a routine executed in a fourth embodiment of the invention.

FIG. 11 shows a flowchart of a routine that the ECU 50 executes in order to realize a system operation of the fourth embodiment. Incidentally, the routine shown in FIG. 11 is repeatedly executed during operation of the internal combustion engine.

As shown in FIG. 11, the ECU 50 firstly determines whether or not the internal combustion engine is in the idle operation (step 400). If this determination is negative, the ECU 50 performs the usual valve timing control, for example, by retarding the closure timing of the exhaust valve 36 to the vicinity of the intake top dead center (step 402). On the other hand, if the determination is positive, the ECU 50 acquires the engine rotation speed Ne by using the detection signal from the crank angle sensor 18, and acquires the cooling liquid temperature via the cooling liquid temperature sensor 60 (step 404).

Next in step 406, the ECU 50 sets the closure timing of the exhaust valve 36 in the exhaust valve early-closure control by referring to the map data shown in FIG. 10 according to the acquired engine rotation speed and the acquired cooling liquid temperature. As a result, a closure timing corrected according to the engine rotation speed and the cooling liquid temperature can be acquired. Then, the ECU 50 can perform the exhaust valve early-closure control by driving the exhaust VVT 40 according to the set value of the closure timing.

As described above, according to this embodiment, it is possible to appropriately control the amount of blowback flow of exhaust gas according to the state of combustion while executing the exhaust valve early-closure control during the idle operation. Hence, it is possible to better the fuel economy performance and the exhaust emission quality during the idle operation, and, along with this, secure idling stability.

Incidentally, in the fourth embodiment, step 406 in FIG. 11 shows a concrete example of the functions of the exhaust valve early-closure control, the rotation-corresponding correction and the temperature-corresponding correction. Besides, with regard to the rotation-corresponding correction and the temperature-corresponding correction, the map data in FIG. 10 also shows a concrete example thereof.

Besides, the fourth embodiment is constructed so that the higher the engine rotation speed, the more retarded the closure timing of the exhaust valve 36 is. However, although the invention has a feature that the closure timing is corrected according to the engine rotation speed during the idle operation, a construction may be adopted in which the lower the engine rotation speed during the idle operation, the more retarded the closure timing of the exhaust valve is, if necessary.

Besides, the fourth embodiment is constructed so that the closure timing of the exhaust valve is corrected according to the cooling liquid temperature detected by the cooling liquid temperature sensor 42. However, in the invention, the cooling liquid temperature is not the only parameter for that purpose; that is, a construction in which the valve closure timing is corrected according to a parameter other than the cooling liquid temperature may also be adopted as long as the parameter reflects the temperature state of the internal combustion engine. Examples of the parameter include the temperature of exhaust gas, the oil temperature of a lubrication oil, etc.

Besides, in fourth embodiment, the exhaust valve early-closure control device is constructed so as to cause blowback of exhaust gas by bringing about the minus overlap period. However, the exhaust valve early-closure control device of the invention does not necessarily need to bring about the minus overlap period, provided that the blowback of exhaust gas occurs.

Next, a fifth embodiment of the invention will be described. Firstly, a general description of the control of a control device in accordance with the fifth embodiment will be given. The target values of the opening/closure timings of the intake valve 34 and the exhaust valve 36 are determined on the basis of the operation speed NE and the cylinder intake fresh air amount Mc. A table that shows relations thereof is shown in FIG. 12.

Figure 12:
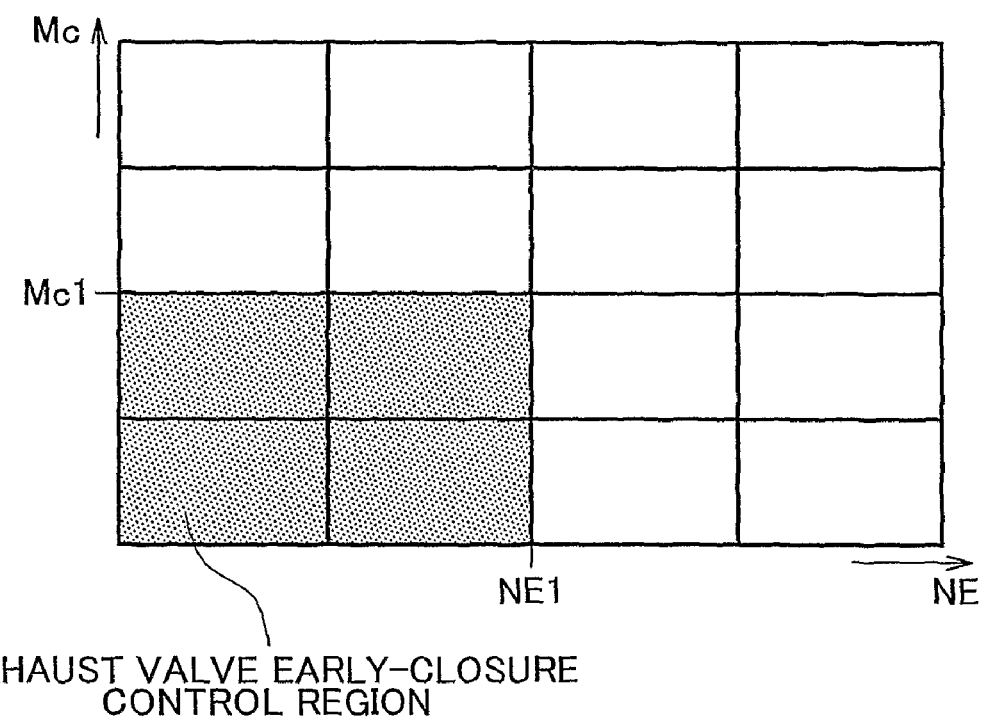
FIG. 12 is a diagram showing a table (usual-time control table) which the CPU of an electric control unit shown in FIG. 1 refers to and which prescribes relations of the target values of the opening/closure timings of the intake valve and the exhaust valve with the operation speed of the internal combustion engine and the cylinder intake fresh air amount.

FIG. 12 shows a table that prescribes the relations of the target values of the opening/closure timings of the intake valve 34 and the exhaust valve 36 with the operation speed NE and the cylinder intake fresh air amount Mc. In this example, the target values of the opening/closure timings are determined in principle on the basis of the operation speed NE, the cylinder intake fresh air amount Mc and the table shown in FIG. 12. Hereinafter, this table is also termed the usual-time control table".

More concretely, in the case where the operation speed NE and the cylinder intake fresh air amount Mc are both smaller than a predetermined first speed NE1 and a predetermined first fresh air amount Mc1, respectively, the target value of the valve opening timing of the intake valve 34 is determined to be a timing that corresponds to the intake top dead center. Besides, in this case, the target value of the valve closure timing of the exhaust valve 36 is determined to be a timing that is a predetermined interval in crank angle to the advanced side from the timing that corresponds to the intake top dead center.

As a result, in the exhaust stroke, a period during which the intake valve 34 and the exhaust valve 36 are both closed (hereinafter, termed "minus valve overlap period") is formed. Over the minus valve overlap period, high-temperature burnt gas is compressed, and heat is conducted from the burnt gas to a member that constitutes the combustion chamber.

Hereinafter, the control of instructing the VVT 38 and the VVT 40 to form the minus valve overlap period will be also termed "the exhaust valve early-closure control". This exhaust valve early-closure control corresponds to the aforementioned minus valve overlap period formation control. Besides, a finely-dotted region in which NE<NE1 and Mc<Mc1 in the usual-time control table shown in FIG. 12 will also be termed "the exhaust valve early-closure control region".

Incidentally, in the exhaust valve early-closure control region, the target value of the valve closure timing of the exhaust valve 36 is determined to be more advanced (i.e., the target value thereof is determined so that the crank angle interval between the valve opening timing of the intake valve 34 and the valve closure timing of the exhaust valve 36 is greater) the smaller the operation speed NE is, and the smaller the cylinder intake fresh air amount Mc is. Hereinafter, the exhaust valve early-closure, control that is executed when the operation speed NE and the cylinder intake fresh air amount Mc are within the exhaust valve early-closure control region will also be termed "the usual-time exhaust valve early-closure control".

The execution of the exhaust valve early-closure control in the foregoing manner is based on the understanding that the temperature of a member that constitutes the combustion chamber (i.e., the cooling liquid temperature THW) can be raised by forming the minus valve overlap period in the case where the operation speed NE and the cylinder intake fresh air amount Mc are small. Therefore, even in the case where the operation speed NE and the cylinder intake fresh air amount Mc are small, for example, the combustion in the combustion chamber can be stabilized.

On the other hand, in the case where the operation speed NE and the cylinder intake fresh air amount Mc are greater than or equal to the predetermined first speed NE1 and the predetermined first fresh air amount Mc1, respectively, the target value of the valve closure timing of the exhaust valve 36 is determined to be a timing on the retarded side of the target value of the valve opening timing of the intake valve 34. As a result, a period in the exhaust stroke and the intake stroke during which the intake valve 34 and the exhaust valve 36 are both open is formed. Incidentally, in this case, the target values of the opening/closure timings of the intake valve 34 and the exhaust valve 36, and the length of the period during which the intake valve 34 and the exhaust valve 36 are both open are adjusted according to the operation speed NE and the cylinder intake fresh air amount Mc.

This is based on the understanding that in the case where, the operation speed NE and the cylinder intake fresh air amount Mc are large, the cooling liquid temperature THW readily rises without formation of the minus valve overlap period during a state in which the outside air temperature THA is equal to a reference outside air, temperature that is not a low outside temperature. That is, in the embodiment, during the state in which the outside air temperature THA is equal to the reference outside air temperature, the predetermined first speed NE1 and the predetermined first fresh air amount Mc1 are set at minimum, values within such ranges of the operation speed NE and the cylinder intake fresh air amount Mc, respectively, that the cooling liquid temperature THW does not have a falling tendency.

By the way, the case where the outside air temperature THA is low (concretely, the outside air temperature THA is lower than the reference outside air temperature) during a state in which NE≧NE1 and Mc≧Mc1 (i.e., a state in which the operation speed NE and the cylinder intake fresh air amount Mc are outside the exhaust valve early-closure control region) will be considered. In this case, a situation can occur in which the cooling liquid temperature THW declines (or the cooling liquid temperature THW less readily rises).

In this case, a situation can occur in which when there is a heater request from the driver of the vehicle, the cooling liquid temperature THW having been higher than or equal to a heater-required temperature changes to a temperature lower than the heater-required temperature. The heater-required temperature herein refers to the temperature of the cooling liquid that meets the heater request from the driver if the request is present. Besides, a situation can occur in which the cooling liquid temperature THW having been lower than the heater-required temperature cannot promptly reach the heater-required temperature.

In order to restrain the occurrence of situations as mentioned above, the control device of this embodiment executes the exhaust valve early-closure control for forming the minus valve overlap period separately from the above-described "usual-time exhaust valve early-closure control" in the case where the operation speed NE and the cylinder intake fresh air amount Mc are outside the exhaust valve early-closure control region and where predetermined conditions of the outside air temperature THA being low and the like are satisfied. Hereinafter, the exhaust valve early-closure control executed in the foregoing case will also be termed "the low-outside air temperature-time exhaust valve early-closure control". What has been described above is a general outline of the control device in accordance with the fifth embodiment.

Next, the foregoing low-outside air temperature-time exhaust valve early-closure control will be described with reference to a flowchart shown in FIG. 13.

Figure 13:
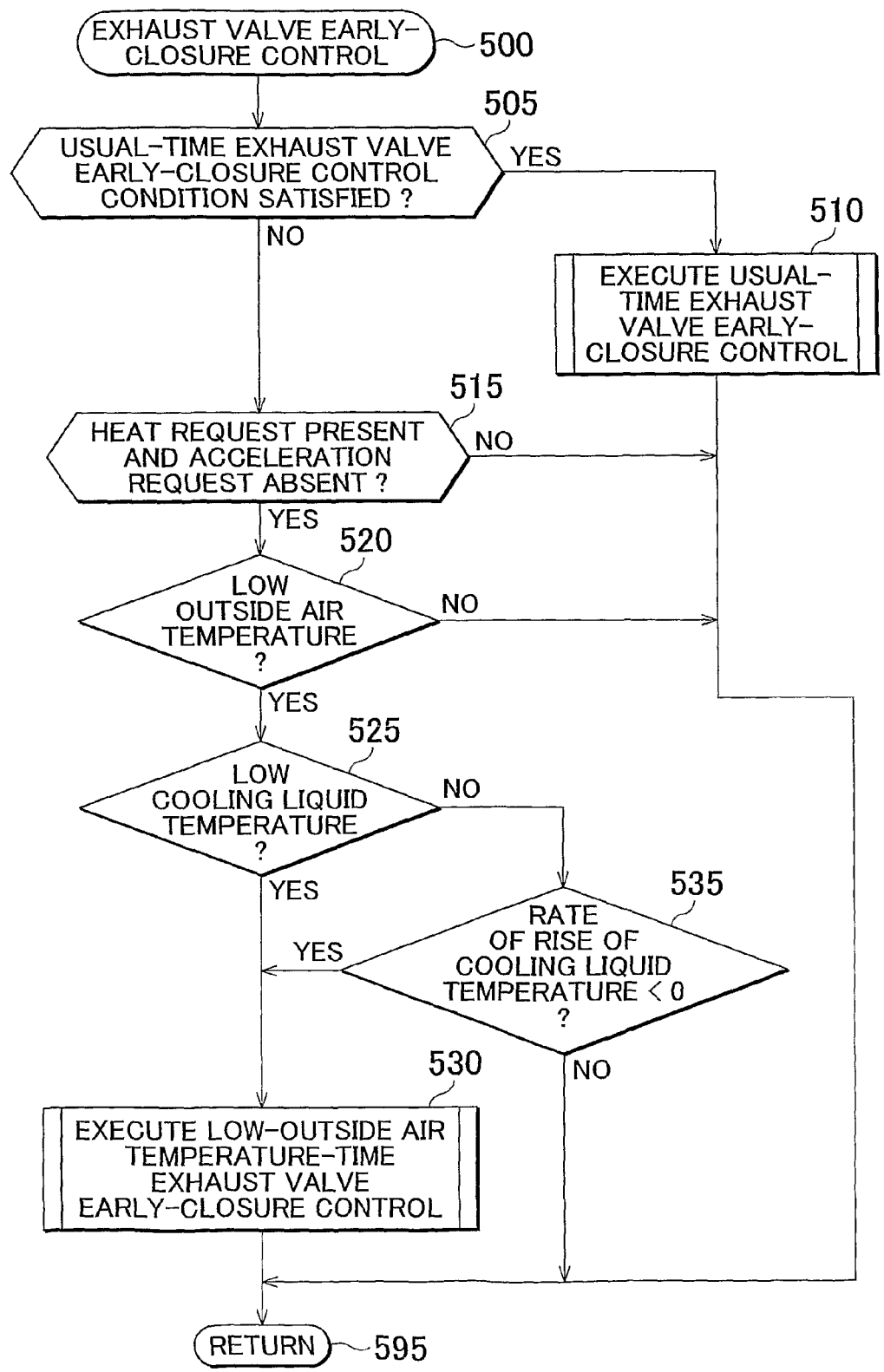
FIG. 13 is a flowchart showing a program for executing an exhaust valve early-closure control that is a control that the CPU of the electric control device shown in FIG. 1 executes in order to form a minus valve overlap period in a fourth embodiment of the invention.

The CPU of the ECU 50 executes the process of a routine shown by the flowchart in FIG. 13 every time a predetermined timing in each combustion cycle of the internal combustion engine 10 arrives. Hence, when the predetermined execution timing of this routine arrives, the CPU starts the process in step 500, and proceeds to step 505, in which the CPU determines whether or not the usual-time exhaust valve early-closure control condition has been satisfied.

Herein, the usual-time exhaust valve early-closure control condition is satisfied if the operation speed NE and the cylinder intake fresh air amount Mc are within the exhaust valve early-closure control region (i.e., if the operation state of the internal combustion engine 10 is a state in which NE<NE1 and Mc<Mc1). That is, the usual-time exhaust valve early-closure control condition corresponds to a predetermined condition that does not include a condition concerning the outside air temperature.

Hence, in the case where the usual-time exhaust valve early-closure control condition is satisfied, the CPU makes an affirmative determination in step 505, and proceeds to step 510, in which the CPU executes the usual-time exhaust valve early-closure control. Then, the CPU proceeds to step 595, in which the CPU temporarily ends the process of this routine.

In the usual-time exhaust valve early-closure control, the minus valve overlap period is formed so as to be longer the smaller the operation speed NE is, and the smaller the cylinder intake fresh air amount Mc is, according to the usual-time control table. A pattern of formation of the minus valve overlap period corresponds to a first pattern in the invention, and the usual-time exhaust valve early-closure control corresponds to a first control in the invention.

On the other hand, if the usual-time exhaust valve early-closure control condition is not satisfied, the CPU makes a negative determination in step 505, and proceeds to step 515, in which the CPU determines whether or not the heater request from the driver is present and the acceleration request from the driver is absent.

Herein, the "heater request being present" means that the heater switch 80 is on at the present time point. Besides, the "acceleration request being absent" means that the accelerator operation amount at the present time point is smaller than an accelerator operation amount that corresponds to a fresh air amount Mc2 that is larger by a predetermined amount than the aforementioned predetermined first fresh air amount Mc1 (which will hereinafter be termed "the second fresh air amount Mc2").

If the condition stated in step 515 in this flowchart is not satisfied, the CPU makes a negative determination in step 515, and immediately proceeds to step 595, in which the CPU temporarily ends the process of this routine. Therefore, in this case, since "NE≧NE1 and Mce≧Mc1", the VVT 38 and the VVT 40 are controlled so that the minus valve overlap period is not formed, on the basis of the usual-time control table.

Not executing the exhaust valve early-closure control in this manner is based on a viewpoint that when the heater request is absent, the need to raise the cooling liquid temperature THW or the need to restrain the decline in the cooling liquid temperature THW is small. Besides, not executing the exhaust valve early-closure control is also based on a viewpoint that even in the case where the heater request is present, the possibility of the cooling liquid temperature THW rising in the future is large if the acceleration request is present.

On the other hand, if the condition state in step 515 is satisfied, the CPU makes an affirmative determination in step 515, and proceeds to step 520, in which the CPU determines whether or not the outside air temperature THA is a low outside air temperature.

Herein, the "outside air temperature THA being a low outside air temperature" means that the outside air temperature THA at the present time point is lower than a minimum temperature (that corresponds to the first threshold value) in the range of the outside air temperature THA in which the cooling liquid temperature THW does not have a falling tendency in the case where the cylinder intake fresh air amount Mc is equal to the second fresh air amount Mc2.

In the case where the condition stated in step 520 is not satisfied, the CPU makes a negative determination in step 520, and immediately proceeds to step 595, in which the CPU temporarily ends the process of this routine. Therefore, in this case, too, the VVT 38 and the VVT 40 are controlled so that the minus valve overlap period is not formed, on the basis of the usual-time control table.

On the other hand, the condition state in step 520 is satisfied, the CPU makes an affirmative determination in step 520, and proceeds to step 525, in which the CPU determines whether or not the cooling liquid temperature THW is a low cooling liquid temperature.

Herein, the "cooling liquid temperature THW being a low cooling liquid temperature" means that the cooling liquid temperature THW at the present time point is lower than the aforementioned heater-required temperature (that corresponds to the second threshold value).

In the case where the condition stated in step 525 is satisfied, the CPU makes a negative determination in step 525, and proceeds to step 530, in which the CPU executes the low-outside air temperature-time exhaust valve early-closure control. Then, the CPU proceeds to step 595, in which the CPU temporarily ends the process of this routine.

In this low-outside air temperature-time exhaust valve early-closure control, the target values of the opening/closure timings of the intake valve 34 and the exhaust valve 36 are each determined to be a constant value (constant crank angle) independently of the usual-time control table. More concretely, in the fifth embodiment, the aforementioned target value is determined so that the minus valve overlap period formed in the low-outside air temperature-time exhaust valve early-closure control is longer than the longest period of the minus valve overlap periods that are formed on the basis of the usual-time control table (i.e., longer than the minus valve overlap period formed in the case where the operation speed NE and the cylinder intake fresh air amount Mc are the minimum values in an assumed range of the operation state). The formation pattern of the minus valve overlap period corresponds to a second pattern in the invention, and the low-outside air temperature-time exhaust valve early-closure control corresponds to a second control in the invention.

On the other hand, in the case where the condition state in step 525 is not satisfied, the CPU makes a negative determination in step 525, and proceeds to step 535, This is based on a viewpoint that even in the case where the outside air temperature THA is the low outside air temperature, the need to raise the cooling liquid temperature THW is small if the cooling liquid temperature THW is higher than or equal to the heater-required temperature.

In step 535, the CPU determines whether or not the rate of rise of the cooling liquid temperature TRW is less than zero. Herein, the "rate of rise of the cooling liquid temperature THW being less than zero" means that the cooling liquid temperature THW at the present time point (that is greater than or equal to the heater-required temperature) is lower than the cooling liquid temperature THW occurring during the execution of the same routine that is a predetermined number of cycles before the present one.

In the case where the condition stated in step 535 is satisfied, the CPU makes an affirmative determination in step 535, and proceeds to step 530, in which the CPU executes the low-outside air temperature-time exhaust valve early-closure control.

Executing the exhaust valve early-closure control in this manner is based on a viewpoint that even in the case where the cooling liquid temperature THW is greater than or equal to the heater-required temperature, it is preferable to restrain the decline in the cooling liquid temperature TRW, if the cooling liquid temperature THW has: a falling tendency. The situation in which the cooling liquid temperature THW has a falling tendency is likely to occur in the case where a state in which the operation speed NE and the cylinder intake fresh air amount Mc are small continues after the operation speed NE and the cylinder intake fresh air amount Mc have declined. The falling tendency is, more conspicuous the lower the outside air temperature THA is.

On the other hand, in the case where the condition stated in step 535 is not satisfied, the CPU makes a negative determination in step 535, and immediately proceeds to step 595, in which the CPU temporarily ends the process of this routine.

As described above, according to the fifth embodiment of the control device for the internal combustion engine of the invention, the usual-time exhaust valve early-closure control is executed in the case where the usual-time exhaust valve early-closure control condition that does not include the condition concerning the outside air temperature THA is satisfied. In this usual-time exhaust valve early-closure control, the smaller the operation speed NE and/or the cylinder intake fresh air amount Mc is, the longer minus valve overlap period is formed, according to the usual-time control table.

On the other hand, in the case where usual-time exhaust valve early-closure control condition is not satisfied, and where the outside air temperature THA is the low outside air temperature, and where the cooling liquid temperature THW is the low cooling liquid temperature, the low-outside air temperature-time exhaust valve early-closure control is executed. In this low-outside air temperature-time exhaust valve early-closure control, the minus valve overlap period (constant in crank angle) that is longer than the longest minus valve overlap period that is formable in the usual-time exhaust valve early-closure control is formed.

Therefore, even in the case where the outside air temperature THA is low when the cooling liquid temperature THW is lower than the heater-required temperature, the degree of rise of the cooling liquid temperature THW can become large. Hence, in this case, the cooling liquid temperature THW can be quickly brought to the heater-required temperature.

Besides, in the case where the usual-time exhaust valve early-closure control condition is not satisfied, and where the outside air temperature THA is the low outside air temperature; and where the cooling liquid temperature THW is not the low cooling liquid temperature, the low-outside air temperature-time exhaust valve early-closure control is not executed in principle. As a result, the opportunity of unnecessary execution of the exhaust valve early-closure control can lessen. Hence, the decline in fuel economy due to formation of the minus valve overlap period can be restrained.

Even if the cooling liquid temperature THW is not the low cooling liquid temperature, the low-outside air temperature-time exhaust valve early-closure control is executed in the case where the cooling liquid temperature THW has a falling tendency. As a result, the decline in the cooling liquid temperature THW that is higher than or equal to the heater-required temperature can be restrained. Hence, in this case, the changing of the cooling liquid temperature THW to a temperature that is lower than the heater-required temperature can be restrained.

The invention is not limited to the foregoing embodiments. On the contrary, various modifications within the scope of the invention can be adopted. For example, although in the fifth embodiment, the minus valve overlap period is formed so as to be constant in crank angle in the low-outside air temperature-time exhaust valve early-closure control, the minus valve overlap period may instead be variable.

In this case, for example, the minus valve overlap period may be formed so that every time the CPU proceeds to step 530, the minus valve overlap period is increased in step 530 by a predetermined duration at a time (i.e., the target value of the valve closure timing of the exhaust valve 36 shifts to the advanced side by a predetermined crank angle at a time). Besides, in step 530, the target value of the valve closure timing of the exhaust valve 36 may be determined to be more advanced so as to make the minus valve overlap period longer the lower the outside air temperature THA is.

Besides, in the fifth embodiment, when the CPU proceeds to step 530, the minus valve overlap period is formed once. Instead, the minus valve overlap period may be formed a plurality of times over a predetermined period following the satisfaction of the condition for executing the low-outside air temperature-time exhaust valve early-closure control.

In this case, for example, the number of times of the formation of the minus valve overlap period may be made greater the lower the outside air temperature THA is. Besides, the number of times of forming the minus valve overlap period may be set at a constant number of times, regardless of the parameters such as the outside air temperature THA or the like.

In addition, although in the fifth embodiment, the formation pattern of the minus valve overlap period is different between the usual-time exhaust valve early-closure control and the low-outside air temperature-time exhaust valve early-closure control, the formation patterns used for the two controls may instead be the same. In this case, for example, the minus valve overlap periods may be formed so as to be spaced from each other by predetermined constant intervals in crank angle.

Next, a sixth embodiment of the control device of the internal combustion engine of the invention will be described. The sixth embodiment is different from the fifth embodiment only in that in the case where a predetermined condition of the outside air temperature THA being the low outside air temperature or the like is satisfied, it is determined whether or not to form the minus valve overlap period, by using a table in which the exhaust valve early-closure region is larger than in the usual-time control table (which will hereinafter be termed "the low-outside air temperature-time control table").

Hereinafter, the features of the sixth embodiment different from those of the fifth embodiment will be described with reference to a flowchart shown in FIG. 14, which corresponds to FIG. 13. In addition, steps in FIG. 14 that are the same as those in FIG. 13 are represented by the same step numbers, and detailed descriptions thereof are omitted below.

When a predetermined execution timing of this routine arrives, a CPU of an ECU 50 in the sixth embodiment starts the process in step 600 to execute the process of step 515 and subsequent processes. If a negative determination is made in any one of steps 515, 520, 535, the CPU process proceeds to step 605, in which the CPU selects the same table as the foregoing usual-time control table (see FIG. 12).

On the other hand, if an affirmative determination is made in each of steps 515, 520, 525, or if a negative determination is made only in step 525 of the three steps and an affirmative determination is made in step 535, the CPU process proceeds to step 610, in which the CPU selects the low-outside air temperature-time control table.

Figure 15:
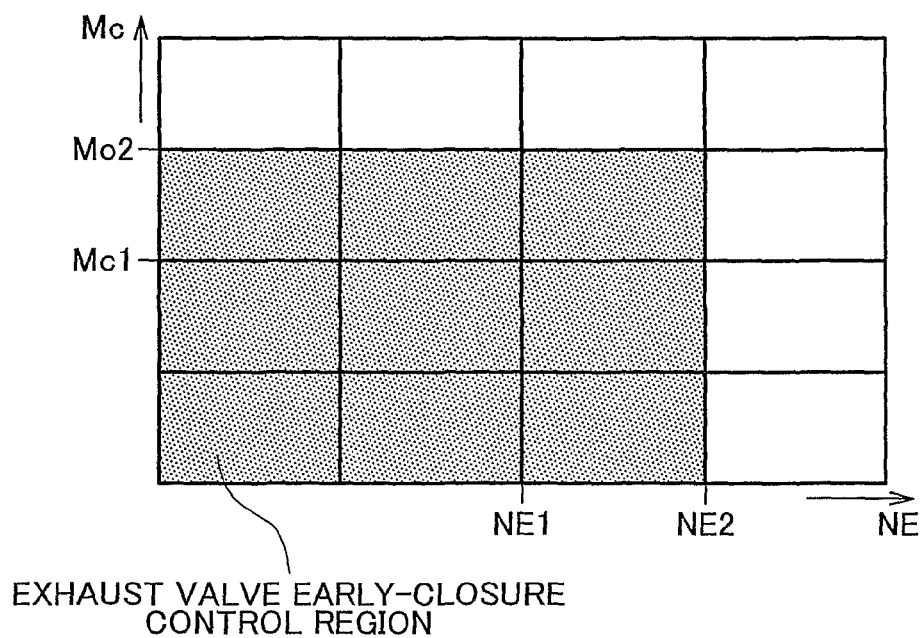
FIG. 15 is a diagram showing a table (low-outside air temperature-time control table) which the CPU of the control device in accordance with the fifth embodiment of the invention refers to and which prescribes relations of the target values of the opening/closure timings of the intake valve and the exhaust valve with the operation speed of the internal combustion engine and the cylinder intake fresh air amount.

FIG. 15 is a diagram showing the aforementioned low-outside air temperature-time control table which corresponds to FIG. 12. According to the low-outside air temperature-time control table, in the case where the operation speed NE is less than a predetermined second speed NE2 that is greater than the first speed NE1 and the cylinder intake fresh air amount Mc is less than the second fresh air amount Mc2 mentioned above in conjunction with the fifth embodiment, target values of the opening/closure timings of the intake valve 34 and the exhaust valve 36 are determined so that the minus valve overlap period is formed as in the foregoing usual-time control table.

In this case, in this example, the predetermined second speed NE2 is set at a minimum value within a range of the operation speed NE that does not cause the cooling liquid temperature THW to decline during a state in which the outside air temperature THA is a lowest assumed temperature.

In the low-outside air temperature-time control table, the region where NE<NE2 and Mc<Mc2 is the aforementioned exhaust valve early-closure control region (see a finely dotted portion in FIG. 15). Besides, in the exhaust valve early-closure control region, the minus valve overlap period is formed so as to be longer the smaller the operation speed NE and the cylinder intake fresh air amount Mc are.

In this embodiment, the exhaust valve early-closure control region in the usual-time control table corresponds to a first range, and the exhaust valve early-closure control region in the low-outside air temperature-time control table corresponds to a second range in the invention.

After selecting one of the usual-time control table and the low-outside air temperature-time control table, the CPU proceeds to step 615, in which the CPU determines whether or not an exhaust valve early-closure control condition has been satisfied. The exhaust valve early-closure control condition herein is satisfied in the case where the operation speed NE and the cylinder intake fresh air amount Mc are within the exhaust valve early-closure control region in the selected table.

Therefore, in the case where the usual-time control table has been selected, if the internal combustion engine 10 is in an operation state in which NE<NE1 and Mc<Mc1, the CPU makes an affirmative determination in step 615, and proceeds to step 620, in which the CPU executes the exhaust valve early-closure control. Subsequently in step 695, the CPU temporarily ends the process of this routine.

On the other hand, in the case where the low-outside air temperature-time control table has been selected, if the internal combustion engine 10 is in an operation state in which NE<NE2 and Mc<Mc2, the CPU makes an affirmative determination in step 615, and proceeds to step 620, in which the CPU executes the exhaust valve early-closure control. Thus, in the case where the low-outside air temperature-time control table has been selected, the exhaust valve early-closure region is larger than in the usual-time control table.

Therefore, even if the operation speed NE and the cylinder intake fresh air amount Mc are outside the exhaust valve early-closure control region in the usual-time control table, the exhaust valve early-closure control is executed provided that the operation speed NE and the cylinder intake fresh air amount Mc are within the exhaust valve early-closure control region of the low-outside air temperature-time control table. Therefore, as in the first embodiment, decline in the cooling liquid temperature TRW can be restrained and the degree of rise of the cooling liquid temperature. THW can be enlarged even in the ease where the outside air temperature THA is low.

On the other hand, in the case where exhaust valve early-closure control condition is satisfied, the CPU makes a negative determination in step 615, and proceeds to step 695, in which the CPU temporarily ends the process of this routine. In this case, the VVT 38 and the VVT 40 are controlled so that the minus valve overlap period is not formed, according to the usual-time control table or the low-outside air temperature-time control table.

As described above, in the sixth embodiment of the control device for an internal combustion engine of the invention, the usual-time control table and the low-outside air temperature-time control table are provided. In the case where a predetermined condition, such as a condition of the outside air temperature THA being the low outside air temperature, or the like, is not satisfied, the usual-time control table is selected from the foregoing two tables. On the other hand, in the case where the predetermined condition is satisfied, the low-outside air temperature-time control table is selected from the two tables. Then, on the basis of the selected table, it is determined whether or not to execute the exhaust valve early-closure control.

Herein, in comparison with the usual-time control table, the exhaust valve early-closure control region is relatively large in the low-outside air temperature-time control table. Therefore, in the case where the outside air temperature THA is the low outside air temperature, the exhaust valve early-closure control can be executed even if the operation state of the internal combustion engine 10 is outside the exhaust valve early-closure control region in the usual-time control table. Therefore, according to the sixth embodiment, the same effects as those of the fifth embodiment can be achieved.

Besides, in the fifth embodiment, the exhaust valve early-closure control is executed regardless of the magnitude of the operation speed NE, in the case where the usual-time exhaust valve early-closure control condition is not satisfied and where a predetermined condition, such as a condition of the outside air temperature THA being the low outside air temperature, or the like, is satisfied.

On the other hand, in the sixth embodiment, even, in the case where the predetermined condition, such as the condition of the outside air temperature THA being the low outside air temperature, or the like, is satisfied and where the low-outside air temperature-time control table has been selected, the exhaust valve early-closure control is not selected, if the operation speed NE is greater than or equal to the predetermined second speed NE. Therefore, in comparison with the fifth embodiment, the incidence of unnecessary execution of the exhaust valve early-closure control can be lessened in the sixth embodiment. As a result, in comparison with the fifth embodiment, the decline in the fuel economy due to the formation of the minus valve overlap period can be restrained.

The invention is not limited by the sixth embodiment, but can adopt various modifications within the scope of the invention. For example, in the sixth embodiment, of the two tables, that is, the usual-time control table and the low-outside air temperature-time control table, one table is selected. However, a construction may also be adopted in which three or more tables that prescribe relations of the operation speed NE and the cylinder intake fresh air amount Mc with the opening/closure timings of the intake valve 34 and the exhaust valve 36, are provided, and one table may be selected from these three tables.

In this case, for example, the three or more tables may be constructed so that the size of the exhaust valve early-closure control region is different from one table to another, and one of the tables that has a larger exhaust valve early-closure control region may be selected if the outside air temperature THA is lower.

Besides, although in the foregoing embodiments, the usual-time control table (as well as the low-outside air temperature-time control table) employs the operation speed NE and the cylinder intake fresh air amount Mc as arguments, the usual-time control table may also be a table in which the cooling liquid temperature THW is added as another argument.

Furthermore, in the fifth and sixth embodiments, in the case where the cooling liquid temperature THW is not the low cooling liquid temperature, it is immediately determined whether or not the cooling liquid temperature THW has a falling tendency. Instead of this, a construction may be adopted in which if the cooling liquid temperature THW is sufficiently high in comparison with the heater-required temperature, the execution of the exhaust valve early-closure control is avoided without performing the determination even in the case where the cooling liquid temperature THW is not the low cooling liquid temperature.

In the case where the cooling liquid temperature THW is sufficiently high in comparison with the heater-required temperature, the cooling liquid temperature THW is, rarely below the heater-required temperature even if the cooling liquid temperature THW has a falling tendency or the like. Therefore, the foregoing possible construction is based on the standpoint that in this case the need to execute the exhaust valve early-closure control is small.

Figure 14:
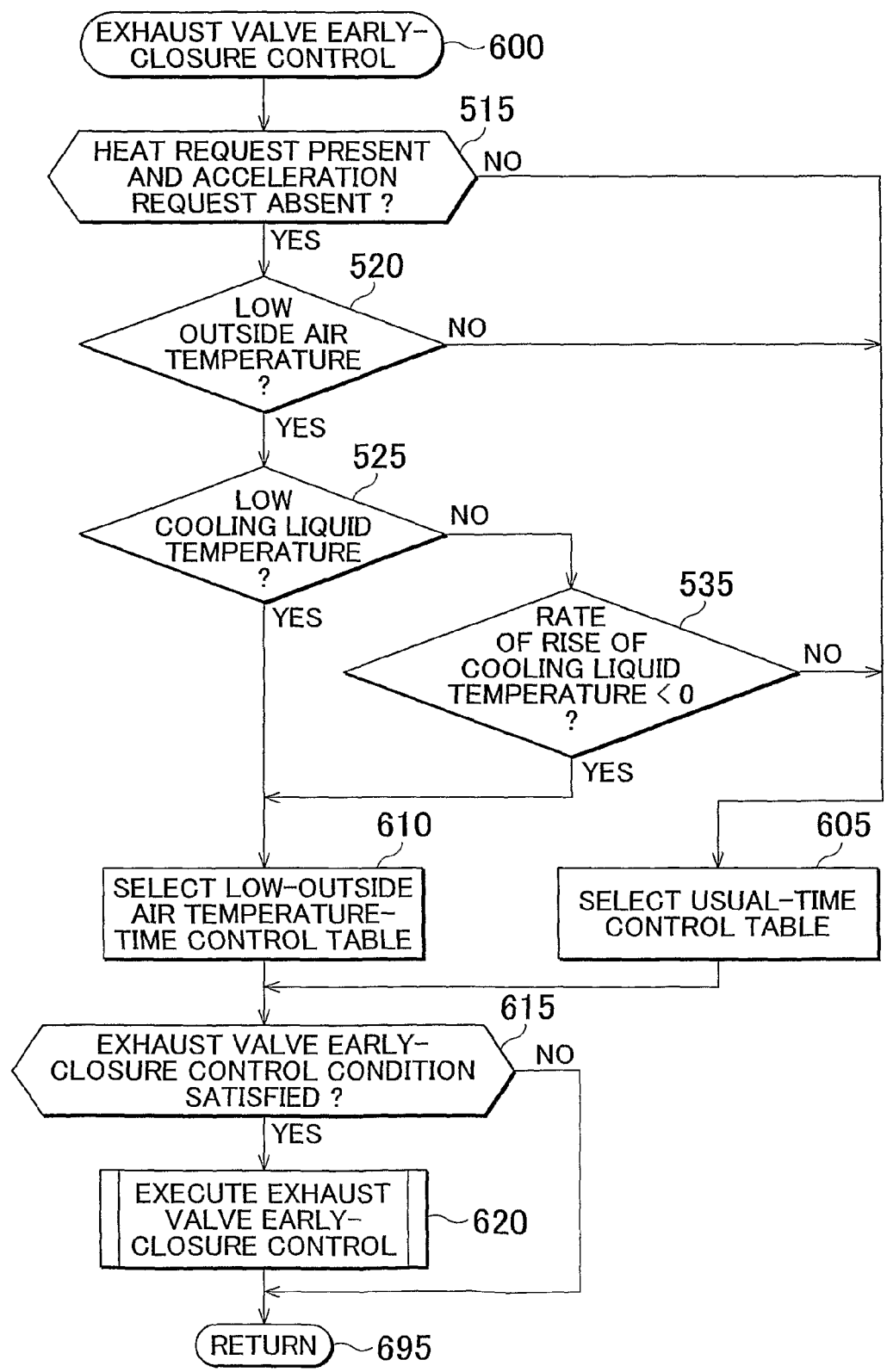
FIG. 14 is a flowchart showing a program for executing the exhaust valve early-closure control which the CPU of a control device in accordance with a fifth embodiment of the invention executes.

In this case, for example, a step of determining whether or not the cooling liquid temperature THW is lower than a temperature that is higher by a predetermined temperature (e.g., 5° C.) than the heater-required temperature may be inserted between step 525 and step 535 in the flowchart in FIG. 13 or FIG. 14. Then, a construction may be adopted in which if an affirmative determination is made in this step, the CPU immediately proceeds to step 595 (or immediately proceeds to step 605, in which the CPU select the usual-time control table), and in which on the other hand, if a negative determination is made in the inserted step, the CPU proceeds to step 5535.

In the fifth and sixth embodiments, the case where the cooling liquid temperature THW has a falling tendency in conjunction with the determination in step 535 is the case where the cooling liquid temperature THW at the present time point is lower than the cooling liquid temperature THW occurring at the time of the execution of the routine that is a predetermined number of cycles of execution prior to the present time point. Instead of this, the case in conjunction with the determination may be the case where the value of a time derivative of the cooling liquid temperature THW at the present time point is a negative value.

In this case, the value of the time derivative may be, for example, a value obtained by dividing the value obtained by subtracting the cooling liquid temperature THW at the time of the present execution of the routine from the cooling liquid temperature THW at the time of the previous execution of the routine by the time that corresponds to the routine execution interval.

Although in each of the fifth and sixth embodiments, the routine for executing the exhaust valve early-closure control includes step 525 and step 535, the routine does not necessarily need to include step 535, or steps 525 and 535.

In addition; as the routine for executing the exhaust valve early-closure control in the fifth and sixth embodiments, the routine shown in FIG. 13 or FIG. 14 is used. Instead of this, the routine for executing the exhaust valve early-closure control may be a routine which includes a table that prescribes relations of the values of the time derivatives of the operation speed NE, the cylinder intake fresh air amount Mc, the outside air temperature THA, the cooling liquid temperature THW and the cooling liquid temperature THW with the target values of the opening/closure timings of the intake valve 34 and the exhaust valve 36, and which achieves substantially the same operation and effects as those achieved by the routine shown in FIG. 13 or 14.

In this case, for example, a construction may also be provided in which the exhaust valve early-closure control is executed in the case where the values of the time derivatives of the operation speed NE, the cylinder intake fresh air amount, Mc, the outside air temperature THA, the cooling liquid temperature THW and the cooling liquid temperature THW at the present time point are within the exhaust valve early-closure control region in the foregoing table. Besides, the foregoing table may be constructed so that the target values of the opening/closure timings of the intake valve 34 and the exhaust valve 36 are determined so that the minus valve overlap period is longer the lower the outside air temperature THA and the cooling liquid temperature THW are.

Next, seventh and eighth embodiments of the invention will be described. In the seventh and eighth embodiments, a control related to the intake negative pressure of the internal combustion engine that is utilized for a booster device provided for a brake device of the invention is dealt with. The intake negative pressure changes according to the state of operation of the internal combustion engine. As a result, depending on the operation state, it can happen that the actual intake negative pressure is short of the intake negative pressure that the booster device requires. As a result, it becomes necessary for a driver of the vehicle to depress the brake pedal more strongly than usual, giving rise to a possibility of deterioration of the operational feel of the brake. Therefore, in the seventh and eighth embodiments, a control described below is implemented so as to dissolve these problems.

As shown in FIG. 1, in the system of this embodiment, a brake device 72 for stopping the vehicle equipped with the internal combustion engine 10 is provided. The brake device 72 is provided with a booster device (not shown) for supplementing the depressing force on the brake pedal when the driver depresses the brake pedal. This booster device generates the assist force for the driver's brake operation by utilizing the intake negative pressure of the internal combustion engine 10 introduced via the negative-pressure passageway 74, so as to reduce the depression force on the brake pedal.

Figure 2B:
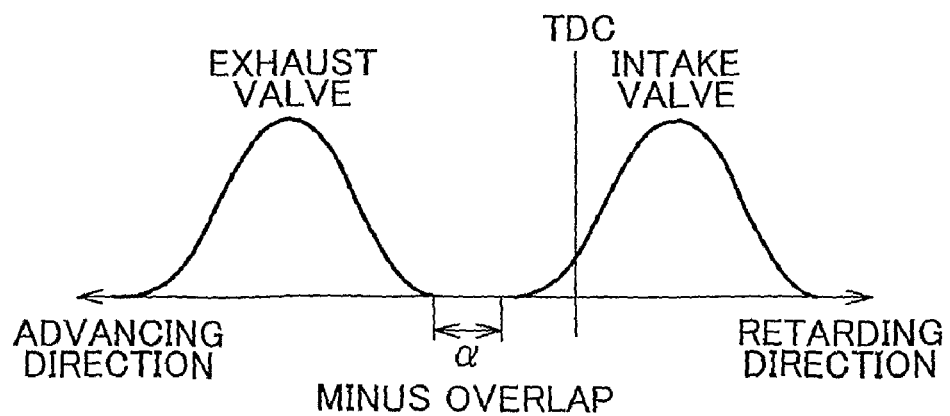
FIG. 2B is an illustrative diagram showing initial valve timings of an intake valve and an exhaust valve.

The ECU 50, when the internal combustion engine 10 is started up, executes a control of operating the valves 34, 36 with predetermined initial valve timing. The initial valve timing herein is, for example, a timing that is used as an initial setting of the valve timing when the operations of the VVTs 38, 40 are started, and the control of operating the valves 34, 36 with predetermined initial valve timing is substantially the same as the exhaust valve early-closure control. FIG. 2B shows the open-close states of the valves 34, 36 with the initial valve timing. In addition, the initial valve timing shown in FIG. 2B is merely an example, and does not limit the invention.

With the initial valve timing, for example, the intake valve 34 is held at the most retarded position that can be achieved by the VVT 38, and the exhaust valve 36 is held at the most advanced position that can be achieved by the VVT 40. Besides, with the initial valve timing, a minus overlap period α during which the two valves 34, 36 are both in the closed state is provided, for example, at a timing that is slightly to the advanced side of the intake top dead center (TDC). This minus overlap period α has a length of, for example, about 10 to 15 CA° (crank angle).

Because of this, in the case where valves 34, 36 operate with the initial valve timing, the exhaust valve 36 closes at an early timing point followed by the minus overlap period α, and after the period α elapses, the intake valve 34 opens. As a result, the exhaust gas remaining in the combustion chamber 14 at the end of the exhaust stroke is compressed in the combustion chamber 14 during the minus overlap period. Then, the exhaust gas blows back into the intake system (the intake passageway 20 side) when the intake valve 34 opens.

Therefore, at the time of starting of the internal combustion engine 10, the amount of blowback exhaust gas can be increased by operating the valves 34, 36 with the initial valve timing, and the emission quality at the time of starting of the engine can be bettered by the blowback.

Next, a deceleration-time standard control will be described. At the time of starting of the internal combustion engine 10, there is a need to maintain the initial valve timing of the valves 34, 36 even at the time point when the VVTs 38, 40 are not supplied with oil pressure or electric power. Therefore, the VVTs 38, 40 are equipped with a lock mechanism (not shown) for mechanically locking the valves 34, 36 to the initial valve timing. The lock mechanism becomes able to perform a locking operation when the valves 34, 36 are operating with the initial valve timing.

Therefore, at the time of deceleration of the internal combustion engine 10, the deceleration-time standard control of operating the valves 34, 36 with the initial valve timing is executed, except for the case where a blowback amount-reducing control described below is executed. That is, in this embodiment, the standard valve timing (standard timing) at the time of deceleration is the initial valve timing.

Because of this, even when the internal combustion engine 10 stops from a decelerating state, the valve timing of the valves 34, 36 can be returned to the initial valve timing. Therefore, when the internal combustion engine 10 stops, the lock mechanism can be promptly operated with the valve timing of the valves 34, 36 set to the initial valve timing, and thus can be made ready for the restart of the engine.

Next, a blowback amount-reducing control will be described. In a vehicle such as a motor vehicle or the like, the driver of the vehicle often performs a brake operation at the time of deceleration of the internal combustion engine 10. In this case, in order to cause the brake device 72 to smoothly operate, there is a need to supply a sufficient magnitude of the intake negative pressure from the intake passageway 20 to the brake device 72 (booster device).

Therefore, when the internal combustion engine 10 enters a decelerating state and a condition for starting the blowback amount-reducing control is satisfied, the ECU 50 performs a blowback amount-reducing control instead of performing the deceleration-time standard control. In this embodiment, the starting condition for the blowback amount-reducing control is set as, for example, a condition that the absolute value of the intake negative pressure P is less than that of a brake required negative pressure P0. The brake required negative pressure P0 herein is a minimum value of negative pressure that is needed in order for the booster device to fully perform its function, and is pre-stored in a memory circuit 52 of the ECU 50.

When the foregoing starting condition for the blowback amount-reducing control has been satisfied, the actual intake negative pressure P is insufficient for the required negative pressure P0 of the brake device 72 if a brake operation is performed. Therefore, the ECU 50 retards the valve timing of the exhaust valve 36 as described below so as to decrease the amount of blowback exhaust gas. Thus, the intake negative pressure can be increased by an amount that corresponds to the reduction in the amount of blowback exhaust gas.

Besides, when the absolute value of the intake negative pressure P becomes equal to or greater than that of the brake required negative pressure P0, the ECU 50 stops the blowback amount-reducing control, and starts the deceleration-time standard control again. That is, the ECU 50 returns the valve timing of the valves 34, 36 to the deceleration-time standard timing (initial valve timing).

Besides, the intake negative pressure P is likely to become insufficient when the internal combustion engine 10 is operated at low speed. Therefore, the blowback amount-reducing control may be constructed so as to be executed when the foregoing starting condition has been satisfied or when the engine rotation speed of the internal combustion engine 10 is lower than a predetermined criterion value.

On another hand, when the internal combustion engine 10 starts to decelerate from high rotation speed, vibration sound becomes likely to be produced from the intake passageway 20 or the like due to exhaust gas blowing back into the intake system. Therefore, the blowback amount-reducing control is also executed when the engine 10 starts to decelerate from a state in which the engine rotation speed is above a certain criterion value. This restrains vibration sound from being produced in the intake system by the blowback of exhaust gas, and therefore can lower the noise level of the internal combustion engine 10.

Figure 3B:
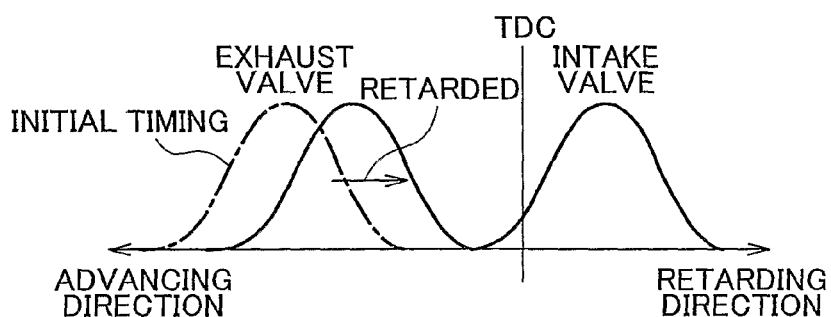
FIG. 3B is an illustrative diagram showing a state in which the valve timing of the exhaust valve is retarded by a blowback amount-reducing control.

FIG. 3B shows a change in the valve timing caused by the blowback amount-reducing control. In the blowback amount-reducing control, the valve timing of the exhaust valve 36 is retarded to the retarded side of the foregoing initial valve timing (shown by a dashed line) by the exhaust-side VVT 40.

By this timing retardation, the valve timing of the exhaust valve 36 is set at a target timing that minimizes the amount of blowback exhaust gas. This target timing is determined beforehand by experiments or the like, and is pre-stored in the memory circuit 52 of the ECU 50. In other words, in the blowback amount-reducing control, the valve timing of the exhaust valve 36 is set so that the minus overlap period α shortens or becomes zero.

Figure 3C:
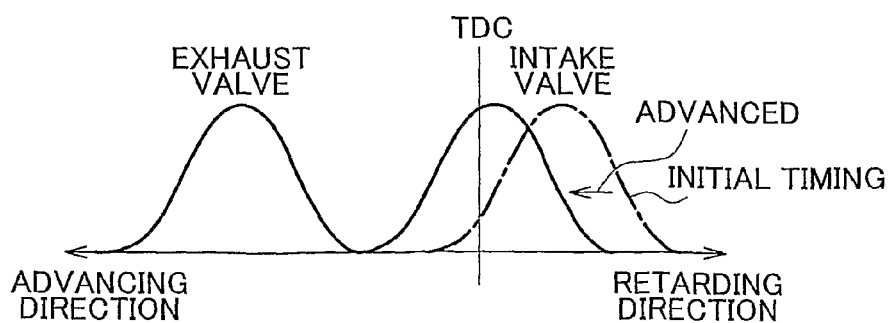
FIG. 3C is an illustrative diagram showing a state in which the valve timing of the intake valve is advanced by the blowback amount-reducing control in an eighth embodiment of the invention.
Figure 3D:
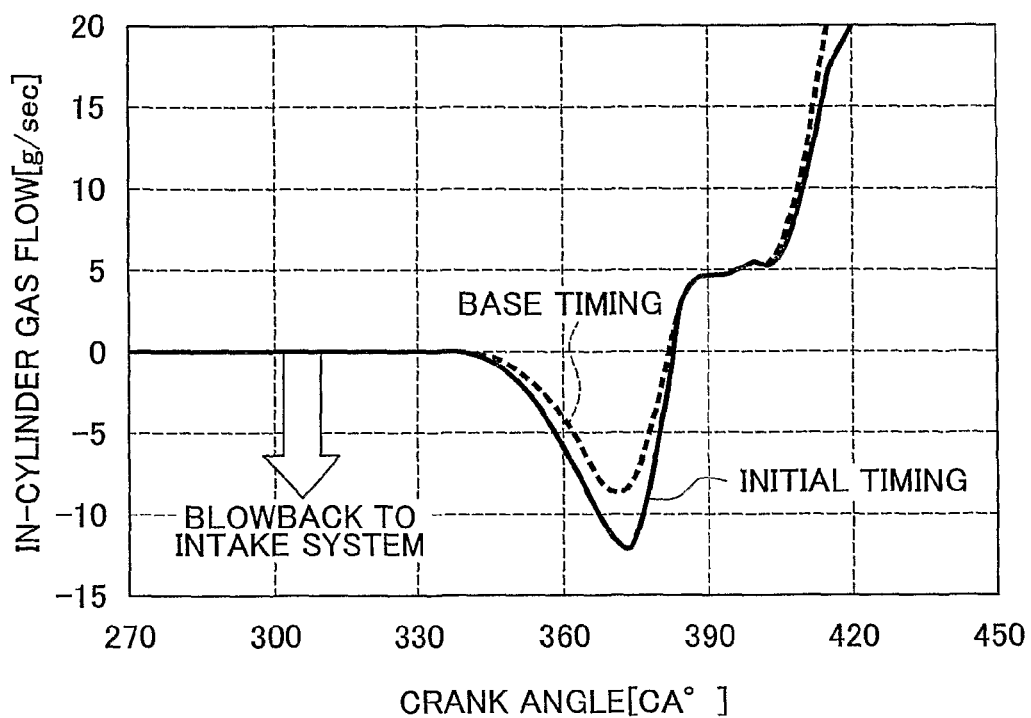
FIG. 3D is an illustrative diagram showing a relation between the amount of blowback into an intake system and the valve timing.

FIG. 3D shows a relation between the valve timing of the exhaust valve 36 and the amount of blowback exhaust gas. The vertical axis of FIG. 3D represents the amount of flow of gas in the combustion chamber 14, and the gas flow amount enlarging on the minus side means that the amount of blowback exhaust gas increases.

A solid line in FIG. 3D shows the amount of blowback exhaust gas with the initial valve timing, and a dotted line shows the amount of blowback exhaust gas with base valve timing. Herein, the base valve timing is a common valve timing that produces a slight overlap between the valves near the intake top dead center. That is, the minus overlap period α is shorter with the base valve timing than with the initial valve timing.

As can be seen from FIG. 3D, the amount of blowback exhaust gas is smaller with the base valve timing than with the initial valve timing. Therefore, in the blowback amount-reducing control, the amount of blowback exhaust gas can be decreased by setting the valve timing so that the minus overlap period α decreases or is brought to zero.

Figure 16:
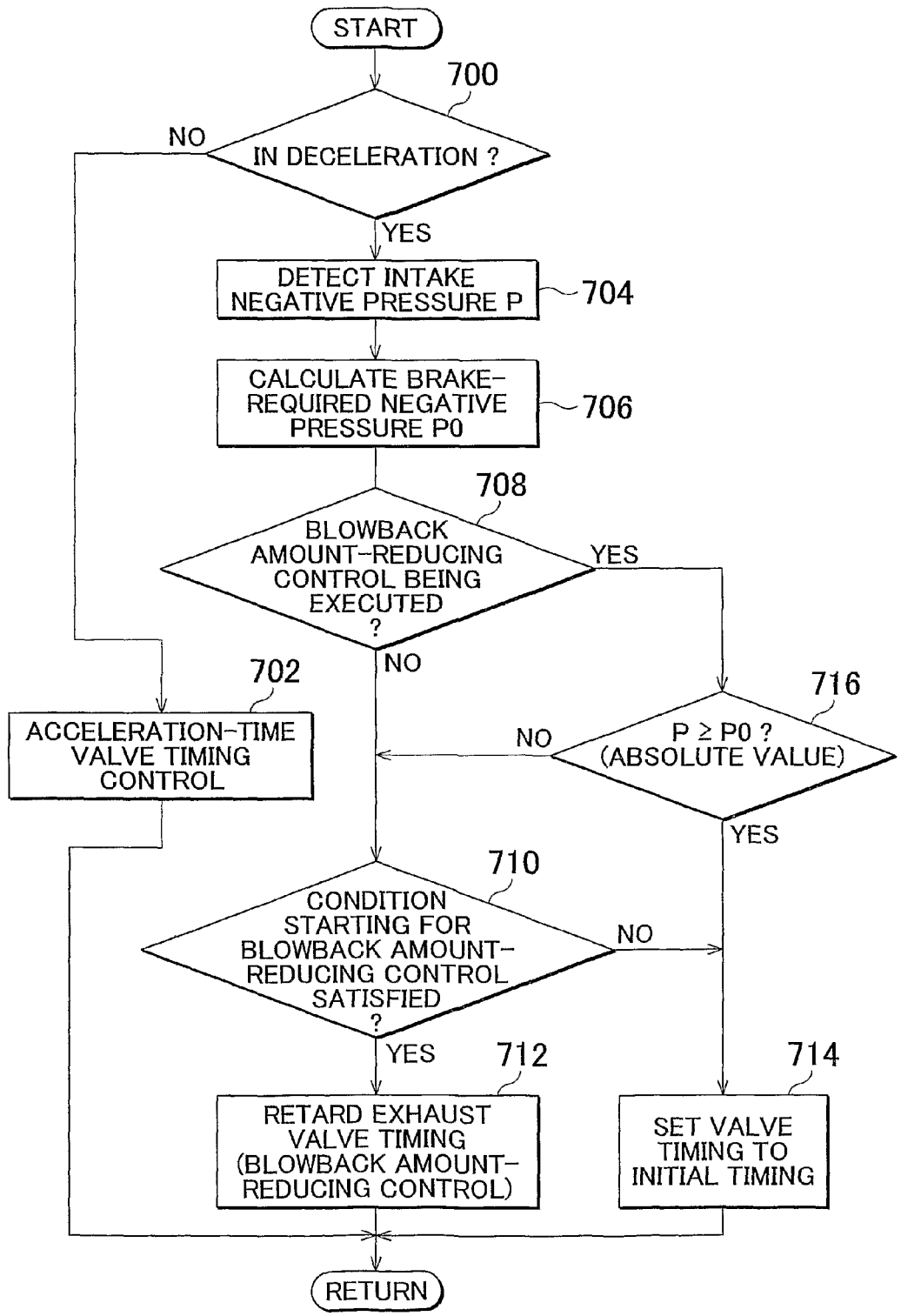
FIG. 16 is a flowchart of a routine executed in a seventh embodiment of the invention.

FIG. 16 is a flowchart of a routine that the ECU 50 executes in order to realize the system operation of this embodiment. In addition, the routine shown in FIG. 16 is started at the time of starting of the internal combustion engine, and is repeatedly executed at every certain amount of time.

Firstly, in step 700, the ECU 50 determines whether or not the internal combustion engine 10 is in a decelerating state. If an affirmative determination is made in this step, the process goes to step 704. On the other hand, if a negative determination is made in step 700, the ECU 50 executes an acceleration-time valve timing control in step 702, and then returns.

Next, in step 704, the ECU 50 detects the intake negative pressure P by the intake air pressure sensor 70. In step 706, the ECU 50 calculates the brake required negative pressure P0. In this case, the brake required negative pressure P0 is calculated by, for example, reading data about the required negative pressure pre-stored in the ECU 50 on the basis of the specifications of the brake device 72 or the like, or performing a correction of the stored data according to the operation state.

Next in step 708, the ECU 50 determines whether or not the blowback amount-reducing control is being executed. If an affirmative determination is made in this step, the process goes to step 716 described below. On the other hand, if a negative determination is made in step 708, the ECU 50 determines in step 710 whether or not the starting condition for the blowback amount-reducing control has been satisfied. More specifically, in step 710, the ECU 50 determines whether or not the intake negative pressure P is less than the brake required negative pressure P0.

If an affirmative determination is made in step 710, it is determined that the intake negative pressure is insufficient for the brake device 72. Therefore, in this case, the ECU 50 implements the blowback amount-reducing control in step 712. That is, in step 712, the ECU 50 operates the exhaust-side VVT 40 so as to retard the valve timing of the exhaust valve 36 to the retarded side of the initial valve timing as shown in FIG. 3B. Due to this timing retardation, the amount of blowback exhaust gas becomes less than the blowback amount with the initial valve timing, and therefore the intake negative pressure P can be increased.

Besides, when the valve timing of the exhaust valve 36 is retarded, the valve timing of the intake valve 34 may be kept to the initial valve timing, or may also be advanced to the advanced side of the initial valve timing as described below in conjunction with the eighth embodiment.

On the other hand, if a negative determination is made in step 710, it is determined that an intake negative pressure sufficient for the brake device 72 is present. Therefore, in this case, the ECU 50 implements the deceleration-time standard control in step 714. That is, in step 714, the ECU 50 sets the valve timing of the valves 34, 36 to the initial valve timing, and returns.

Furthermore, in step 716, the ECU 50 determines whether or not the intake negative pressure P has risen to or above the brake required negative pressure P0 during the execution of the blowback amount-reducing control. If an affirmative determination is made in this step, it is determined that a sufficient intake negative pressure has been produced by the blowback amount-reducing control. Therefore, in this case, the ECU 50 implements the deceleration-time standard control in step 714, so as to return the valve timing of the valves 34, 36 to the initial valve timing. On the other hand, if a negative determination is made in step 716, the ECU 50 goes back to step 710 to continue the blowback amount-reducing control.

According to the seventh embodiment, the ECU 50 is able to determine whether or not an intake negative pressure sufficient for the brake device 72 has been produced when the internal combustion engine 10 enters a decelerating state. Then, if it is determined that the intake negative pressure is sufficient, the ECU 50 can set the valve timing to a standard timing for the time of deceleration, and can become ready for a stop or a restart of the internal combustion engine 10.

Besides, if it is determined that the intake negative pressure is insufficient, the valve timing of the exhaust valve 36 can be retarded by the blowback amount-reducing control. Therefore, the amount of blowback exhaust gas can be decreased, and the intake negative pressure can be heightened.

Therefore, at the time of deceleration during which the brake operation is likely to be performed, an intake negative pressure sufficient for the brake device 72 can be stably secured. Therefore, it becomes possible to avoid the increase of the brake operation force and, the deterioration of the operational feel being caused by the intake negative pressure becoming insufficient, and therefore favorably operate the brake device 72.

Besides, in the blowback amount-reducing control, the valve timing of the exhaust valve 36 can be retarded by the exhaust-side VVT 40. Therefore, the minus overlap period α between the two valves 34, 36 can be made short. As a result, the exhaust gas in the combustion chamber 14 will not be extremely compressed during the minus overlap period. Therefore, the amount of blowback exhaust gas can be reduced, and the intake negative pressure can be heightened.

In this case, in the blowback amount-reducing control, such an optimum valve timing that the amount of blowback exhaust gas becomes minimum can be determined beforehand through experiments or the like. This optimum valve timing can be pre-stored as a target timing in the memory circuit 52 of the ECU 50. Then, in the blowback amount-reducing control, the valve timing of the exhaust valve 36 can be retarded to the target timing. Therefore, the blowback of exhaust gas can be decreased to a minimum amount, and the intake negative pressure can be maximally heightened.

When the intake negative pressure is sufficiently raised by performing the blowback amount-reducing control, the ECU 50 can stop the blowback amount-reducing control. Therefore, the valve timing of the exhaust valve 36 can be returned to the standard timing. Thus, suitable control can be performed according to situation.

Next, with reference to FIG. 3C and FIG. 17, the eighth embodiment of the invention will be described. Incidentally, the same component elements of the eighth embodiment as those of the seventh embodiment are represented by the same reference characters, and the description thereof will be omitted.

A system of this embodiment includes substantially the same construction as in the seventh embodiment (see FIG. 1). The system is constructed so that when it is determined that the intake negative pressure is insufficient for the brake device 72, the blowback amount-reducing control is performed. However, the blowback amount-reducing control: is constructed so as to advance the valve timing of the intake valve 34 to the advanced side of the initial valve timing. In this respect, the eighth embodiment is different from the seventh embodiment.

FIG. 3C shows a change in the valve timing caused by the blowback amount-reducing control. In the blowback amount-reducing control of this embodiment, the valve timing of the intake valve 34 is advanced to the advanced side of the initial valve timing (shown by a dashed line) by the intake-side VVT 38. Due to this timing advancement, the valve timing of the intake valve 34 is set to such a target timing that the amount of blowback exhaust gas becomes minimum. This target timing is determined beforehand through experiments or the like, and is pre-stored in the memory circuit 52 of the ECU 50.

In other words, in the blowback amount-reducing control, the valve timing of the intake valve 34 is set so that the minus overlap period α shortens or becomes zero. Therefore, the blowback amount-reducing control of this embodiment can also make the amount of blowback exhaust gas Less than the amount thereof obtained with the initial valve timing.

Figure 17:
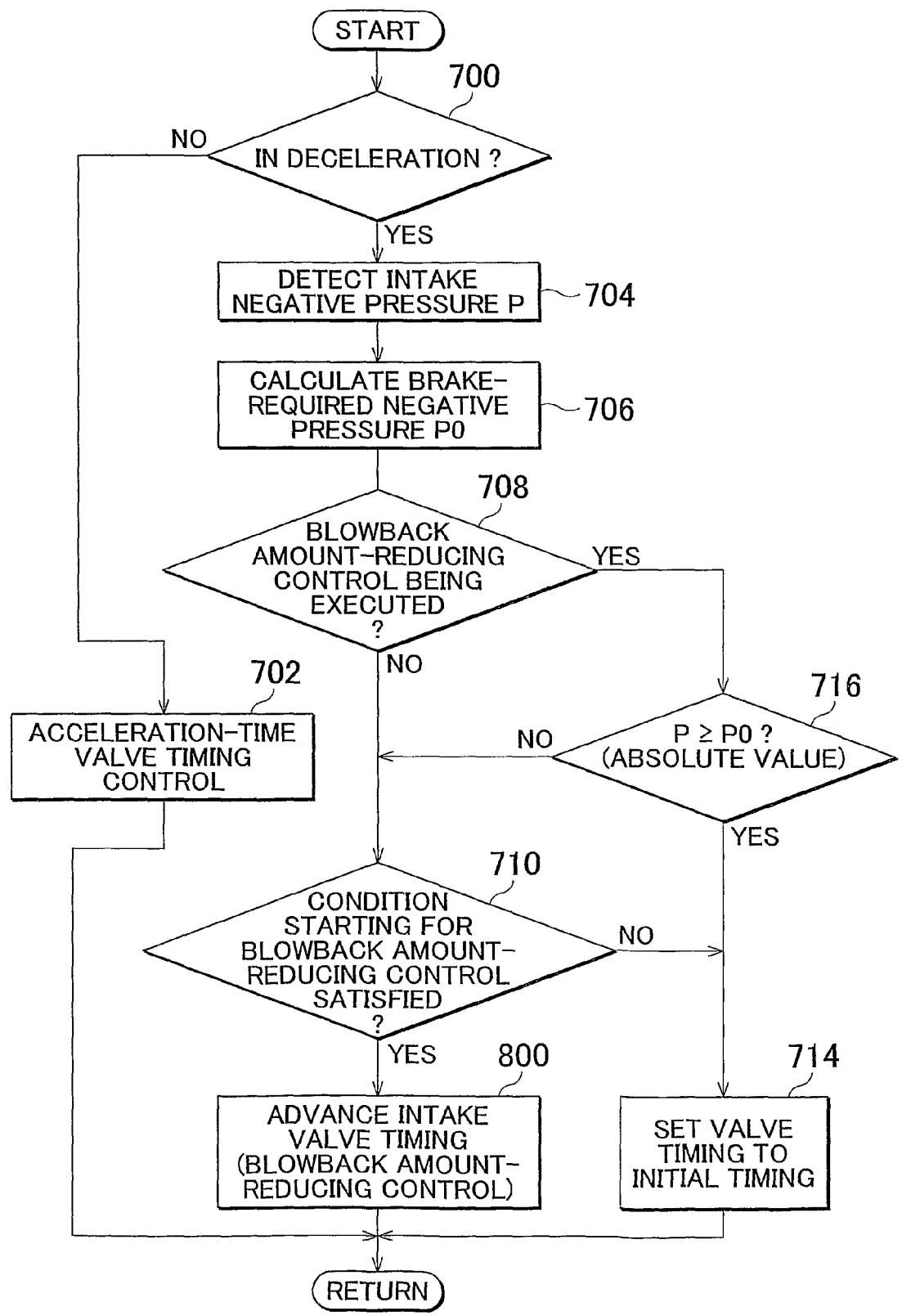
FIG. 17 is a flowchart of a routine executed in the eighth embodiment of the invention.

FIG. 17 is a flowchart of a routine that the ECU 50 executes in order to realize a system operation of the eighth embodiment. Incidentally, in the description of FIG. 17, the same processes as in the seventh embodiment (FIG. 16) are represented with the same step numbers, and the description thereof will be omitted. As shown in FIG. 17, in the eighth embodiment, when the blowback amount-reducing control is performed in step 800, the valve timing of the intake valve 34 is advanced.

The eighth embodiment constructed as described above can achieve substantially the same operation and effects as the seventh embodiment. In particular, this embodiment is constructed so that when the blowback amount-reducing control is performed, the valve timing of the intake valve 34 is advanced by the intake-side VVT 38. This construction can also shorten the minus overlap period α of the valves 34, 36, and therefore can decrease the amount of blowback exhaust gas.

Furthermore, in the eighth embodiment, the following effects can further be obtained by advancing the timing of the intake valve 34.

Firstly, when the internal combustion engine 10 is stopped, the valve timing of the valves 34, 36 needs to be kept to the initial valve timing via the VVTs 38, 40 so as to be ready for restart of the engine. As for the intake-side VVT 38, the operating direction thereof for returning the advanced timing of the intake valve 34 to the initial valve timing is the same as the rotating direction of the crankshaft 16. Therefore, the intake-side VVT 38 has a faster speed of returning the timing of the intake valve 34 to the initial valve timing than the exhaust-side VVT 40.

That is, even in the case where the valve timing is advanced when the engine rotation speed is low, the intake-side VVT 38 can return the valve timing to the initial valve timing at high speed during a period before the internal combustion engine 10 stops. Therefore, by advancing the valve timing of the intake valve 34, it becomes possible to implement the blowback amount-reducing control even in a lower engine rotation speed range. As a result, in a wide range from high rotation speed to low rotation speed, an intake negative pressure sufficient for the brake device 72 can be stably secured.

In the seventh and eighth embodiments, step 710 in FIGS. 16 and 17 shows a concrete example of the determination regarding negative pressure, and step 714 in the flowcharts shows a concrete example of the standard timing setting. Besides, steps 712, 800 in FIGS. 16 and 17 show a concrete example of the reduction of the blowback amount, and step 716 therein shows a concrete example of the return to the initial valve timing.

Besides, the seventh and eighth embodiments have a construction in which the intake air pressure sensor 70 is used as a negative pressure acquisition device. However, the invention is not limited so, but may also be constructed so that, for example, the intake negative pressure is putatively calculated according to the engine rotation speed of the internal combustion engine 10, the state of load thereof, etc.

Besides, the seventh embodiment is constructed so that the valve timing of the exhaust valve 36 is retarded in order to execute the blowback amount-reducing control, and the eighth embodiment is constructed so that the valve timing of the intake valve 34 is advanced in order to execute the blowback amount-reducing control. However, the invention is not limited so, but may also be constructed by combining the seventh and eighth embodiments so that the timing retardation of the exhaust valve 36 and the timing advancement of the intake valve 34 are executed together in the blowback amount-reducing control.

Besides, in the foregoing embodiments, both the intake-side VVT 38 and the exhaust-side VVT 40 are mounted on the internal combustion engine 10. However, the invention is not limited so, but may also be applied to an internal combustion engine that is equipped with only one of the VVTs 38, 40. That is, the seventh embodiment may also be constructed so that the intake-side VVT 38 is not provided but only the exhaust-side VVT 40 is mounted. Besides, the eighth embodiment may also be constructed so that the exhaust-side VVT 40 is not provided but only the intake-side VVT 38 is mounted.

Besides, the foregoing embodiments have been described in conjunction with an example in which the brake required negative pressure P0 is a constant value. However, the invention is not limited so, but may also be constructed so that, for example, the brake required negative pressure P0 is changed according to the operation state of the internal combustion engine 10, the operation state of the brake device 72, etc.

Besides, the foregoing embodiments have been described in conjunction with an example in which the starting condition for the blowback amount-reducing control is a condition that the intake negative pressure P is less than the brake required negative pressure P0, However, the starting condition in the invention is not limited so, but may also be, for example, a condition that the intake negative pressure P is less than the brake required negative pressure P0 and that the engine rotation speed is below a criterion value.

Furthermore, the foregoing embodiments have been described in conjunction with an example in which the standard timing during deceleration is the initial valve timing that provides the minus overlap period α. However, the invention is not limited so, but the deceleration-time standard timing may also be arbitrary timing that conforms to the requirements of the internal combustion engine or the like. Therefore, in the invention, the standard timing does not necessarily need to provide the minus overlap period α.

The invention claimed is:

1. An internal combustion engine control device comprising:
a variable valve mechanism that variably sets valve timing of at least one of an intake valve and an exhaust valve of an internal combustion engine;
a blowback generation device that causes blowback of exhaust gas from a cylinder toward an intake system through control of the valve timing by the variable valve mechanism;
a usual valve timing control device that, when the blowback generation device is not in operation, controls the valve timing while having a less amount of blowback exhaust gas than the blowback generation device by operating the variable valve mechanism according to an operation state of the internal combustion engine;
an injection amount increase device that calculates an increase in injection amount for keeping fuel injection amount of the internal combustion engine in an increased state, and decreases the increase in injection amount as time elapses; and
a blowback prohibition device that prohibits operation of the blowback generation device when the increase in injection amount decreases to or below a lower-limit criterion value.

2. The control device according to claim 1, wherein the blowback generation device causes blowback of exhaust gas from the cylinder toward the intake system by controlling an exhaust valve closure timing of the exhaust valve in crank angle to an advanced side from the timing that corresponds to an intake top dead center.

3. The control device according to claim 1, wherein the blowback prohibition device prohibits operation of the blowback generation device when an acceleration request for the internal combustion engine is detected.

4. The control device according to claim 1, wherein the blowback generation device brings about a minus overlap period during which the intake valve and the exhaust valve are in a closed state near an intake top dead center, and the usual valve timing control device makes the minus overlap period shorter than the blowback generation device.

5. The control device according to claim 1, wherein the lower-limit criterion value is set according to such a minimum increase in injection amount that a combustion state of the internal combustion engine is able to be stabilized even when blowback of exhaust gas occurs.

6. The control device according to claim 1, wherein the blowback prohibition device prohibits operation of the blowback generation device when generation of an acceleration request for the internal combustion engine is expected.

7. The control device according to claim 6, further comprising
an idling detection device that outputs an idle signal when an accelerator operation device that is operated to accelerate or decelerate the internal combustion engine is in a non-operated state, wherein
the blowback prohibition device expects generation of the acceleration request when output of the idling detection device changes from the idle signal to a non-idle signal.

8. The control device according to claim 6, further comprising
a shift position detection device that detects whether a shift operation device that is operated to perform transmission speed shift operation of the internal combustion engine is present at a neutral position or a drive operation position, wherein
the blowback prohibition device expects generation of the acceleration request when the shift operation device is switched from the neutral position to the drive operation position.

9. The control device according to claim 1, wherein
the blowback generation device implements an exhaust valve early-closure control of advancing a closure timing of the exhaust valve by operating the variable valve mechanism so as to bring about blowback of exhaust gas in the intake system, and the control device further comprises
a rotation-corresponding correction device that corrects the closure timing of the exhaust valve set by the exhaust valve early-closure control according to engine rotation speed during an idle operation of the internal combustion engine.

10. The control device according to claim 9, wherein
the rotation-corresponding correction device retards the closure timing of the exhaust valve further if the engine rotation speed during the idle operation is higher.

11. The control device according to claim 9, further comprising:
a temperature detection device that detects a temperature state of the internal combustion engine; and
a temperature-corresponding correction device that retards the closure timing of the exhaust valve further if the temperature state of the idle operation is higher.

12. The control device according to claim 1, further comprising
an outside air temperature acquisition device that acquires temperature of an outside air, wherein
the blowback generation device determines, based on at least the outside air temperature, whether or not to execute a minus valve overlap period formation control of controlling the variable valve mechanism so as to form a minus valve overlap period that is a period during which both the intake valve and the exhaust valve remain closed, and executes the minus valve overlap period formation control if it is determined that the minus valve overlap period formation control is to be executed.

13. The control device according to claim 12, wherein
the blowback generation device executes as the minus valve overlap period formation control a first control of determining the minus valve overlap period in accordance with a first pattern if a predetermined condition that does not include a condition that concerns the outside air temperature is satisfied, and the blowback generation device executes as the minus valve overlap period formation control a second control of determining the minus valve overlap period in accordance with a second pattern if the predetermined condition is not satisfied and the outside air temperature is lower than a first threshold value.

14. The control device according to claim 13, further comprising:
a temperature detection device that acquires temperature of a cooling liquid of the internal combustion engine, wherein
the blowback generation device executes the second control in a case where the predetermined condition is not satisfied, and where the outside air temperature is lower than the first threshold value, and where the cooling liquid temperature is lower than a second threshold value.

15. The control device according to claim 14, wherein
the blowback generation device executes the second control also in a case where the predetermined condition is not satisfied, and where the outside air temperature is lower than the first threshold value, and where the cooling liquid temperature is higher than or equal to the second threshold value, and where the cooling liquid temperature has a falling tendency.

16. The control device according to claim 12, wherein
the blowback generation device determines a range of value of a parameter representing the operation state of the internal combustion engine so that the range is larger in a case where the outside air temperature is a second temperature than in a case where the outside air temperature is a first temperature that is higher than the second temperature, and executes the minus valve overlap period formation control if the value of the parameter is within the range.

17. The control device according to claim 16, wherein
the blowback generation device determines the range to be the first range if the outside air temperature is higher than or equal to a first threshold value, and the blowback generation device determines the range to be a second range that is larger than the first range if the outside air temperature is lower than the first threshold value.

18. The control device according to claim 17, further comprising:
a temperature detection device that acquires temperature of a cooling liquid of the internal combustion engine, wherein
the blowback generation device determines the range to be the second range in a case where the outside air temperature is lower than the first threshold value and where the cooling liquid temperature is lower than a second threshold value.

19. The control device according to claim 18, wherein
the blowback generation device determines the range to be the second range also in a case where the outside air temperature is lower than the first threshold value, and where the cooling liquid temperature is higher than or equal to the second threshold value, and where the cooling liquid temperature has a falling tendency.

20. The control device according to claim 1, further comprising:
a negative pressure acquisition device that acquires intake negative pressure of the internal combustion engine;
a negative pressure determination device that determines whether or not there is a sufficient intake negative pressure for a brake device when the internal combustion engine enters a decelerating state; and
a standard timing setting device that sets the valve timing to a standard timing adapted for a time of deceleration via the variable valve mechanism when it is determined by the negative pressure determination device that the intake negative pressure is sufficient, wherein
when it is determined by the negative pressure determination device that the intake negative pressure is insufficient, the blowback generation device makes the amount of blowback exhaust gas to the intake system less than the amount of blowback that is caused by the standard timing, by changing the valve timing via the variable valve mechanism.

21. The control device according to claim 20, wherein
the standard timing is an initial valve timing that is used as an initial setting of the valve timing when the variable valve mechanism starts to operate.

22. The control device according to claim 20, further comprising:
a memory device in which the valve timing that minimizes the amount of blowback exhaust gas is pre-stored as a target timing, wherein
the blowback generation device sets the valve timing to the target timing when the amount of blowback exhaust gas is to be decreased.

23. The control device according to claim 20, further comprising:
a return device that returns the valve timing to the standard timing when a sufficient intake negative pressure occurs during operation of the blowback generation device.

24. The control device according to claim 20, wherein
the standard timing provides a minus overlap period during which both the intake valve and the exhaust valve are in a closed state, and the blowback generation device decreases the amount of blowback exhaust gas by shortening the minus overlap period.

25. The control device according to claim 24, wherein
the blowback generation device shortens the minus overlap period by retarding the valve timing of the exhaust valve.

26. The control device according to claim 24, wherein
the blowback generation device shortens the minus overlap period by advancing the valve timing of the intake valve.

* * * * *